United States Patent
Hunt et al.

(10) Patent No.: US 10,757,101 B2
(45) Date of Patent: Aug. 25, 2020

(54) USING HASH SIGNATURES OF DOM OBJECTS TO IDENTIFY WEBSITE SIMILARITY

(71) Applicant: RiskIQ, Inc., San Francisco, CA (US)

(72) Inventors: Adam Hunt, El Cerrito, CA (US); David Pon, Sunnyvale, CA (US); Chris Kiernan, San Francisco, CA (US); Ben Adams, San Ramon, CA (US); Jonas Edgeworth, San Francisco, CA (US); Elias Manousos, San Francisco, CA (US); Joseph Linn, Emeryville, CA (US)

(73) Assignee: RiskIQ, Inc., San Francisco, CA (US)

( * ) Notice: Subject to any disclaimer, the term of this patent is extended or adjusted under 35 U.S.C. 154(b) by 0 days.

(21) Appl. No.: 16/141,917

(22) Filed: Sep. 25, 2018

(65) Prior Publication Data
US 2019/0028473 A1   Jan. 24, 2019

Related U.S. Application Data

(63) Continuation of application No. 15/625,877, filed on Jun. 16, 2017, now Pat. No. 10,084,779, which is a
(Continued)

(51) Int. Cl.
*H04L 29/06* (2006.01)
*G06F 16/958* (2019.01)
(Continued)

(52) U.S. Cl.
CPC ........ *H04L 63/0876* (2013.01); *G06F 16/958* (2019.01); *G06F 21/128* (2013.01);
(Continued)

(58) Field of Classification Search
CPC .......... G06F 21/128; G06F 2221/2119; G06F 16/951; G06F 16/958; G06F 17/30864;
(Continued)

(56) References Cited

U.S. PATENT DOCUMENTS 7,647,331 B2 * 1/2010 Li .......................... G06F 16/951
 382/218
8,010,544 B2 * 8/2011 Tiyyagura ............... G06F 16/81
 707/758

(Continued)

OTHER PUBLICATIONS

U.S. Appl. No. 15/625,877, Notice of Allowance dated May 22, 2018.

*Primary Examiner* — Samson B Lemma
(74) *Attorney, Agent, or Firm* — Wong & Rees LLP; Kirk D. Wong

(57) ABSTRACT

Embodiments are directed to using a hash signature of a rendered DOM object of a website to find similar content and behavior on other websites. Embodiments break a DOM into a large number of data portions (i.e., "shingles"), apply a hashing algorithm to the shingles, select a predetermined number of hashes from the hashed shingles according to a selection criteria to create a hash signature, and compare the hash signature to that of a reference page to determine similarity of website DOM object content. Embodiments can be used to identify phishing websites, defaced websites, spam websites, significant changes in the content of a webpage, copyright infringement, and any other suitable purposes related to the similarity between website DOM object content.

20 Claims, 14 Drawing Sheets

Related U.S. Application Data continuation of application No. 15/161,109, filed on May 20, 2016, now Pat. No. 9,686,283, which is a continuation of application No. 14/938,814, filed on Nov. 11, 2015, now Pat. No. 9,386,037.

(60) Provisional application No. 62/219,624, filed on Sep. 16, 2015.

(51) Int. Cl.
*G06F 21/12* (2013.01)
*H04L 9/32* (2006.01)
*G06F 16/951* (2019.01)

(52) U.S. Cl.
CPC .......... *H04L 9/3247* (2013.01); *H04L 63/123* (2013.01); *H04L 63/1416* (2013.01); *H04L 63/1483* (2013.01); *G06F 16/951* (2019.01); *G06F 2221/2119* (2013.01); *H04L 63/10* (2013.01); *H04L 63/1425* (2013.01); *H04L 2463/103* (2013.01)

(58) Field of Classification Search
CPC . G06F 17/3089; H04L 63/0876; H04L 63/10; H04L 63/123; H04L 63/1416; H04L 63/1425; H04L 63/1483; H04L 2463/103; H04L 9/3247
USPC .................. 713/167, 176; 726/23
See application file for complete search history.

(56) References Cited

U.S. PATENT DOCUMENTS

| | | | |
|---|---|---|---|
| 8,081,824 B2* | 12/2011 | Li | G06F 16/951 382/190 |
| 8,468,597 B1* | 6/2013 | Warner | G06Q 10/10 705/50 |
| 8,495,735 B1* | 7/2013 | Warner | H04L 51/12 705/50 |
| 8,943,588 B1* | 1/2015 | Speegle | H04L 63/1483 726/22 |
| 9,386,037 B1 | 7/2016 | Hunt et al. | |
| 9,686,283 B2 | 6/2017 | Hunt et al. | |
| 2011/0258532 A1* | 10/2011 | Ceze | G06F 16/9574 715/234 |
| 2012/0284270 A1* | 11/2012 | Lee | G06F 16/93 707/737 |
| 2013/0086677 A1* | 4/2013 | Ma | H04L 63/1483 726/22 |
| 2013/0332444 A1* | 12/2013 | Kondratova | H04L 67/02 707/709 |
| 2014/0283067 A1* | 9/2014 | Call | H04L 63/1425 726/23 |
| 2015/0067839 A1* | 3/2015 | Wardman | G06F 16/9566 726/22 |
| 2015/0186496 A1* | 7/2015 | Tripp | G06F 16/95 707/740 |
| 2017/0078286 A1 | 3/2017 | Hunt et al. | |
| 2017/0286544 A1 | 10/2017 | Hunt et al. | |
| 2019/0149626 A1* | 5/2019 | Shah | G06F 17/18 706/12 |

\* cited by examiner

Document Object Model ← 410

```
<?xml version="1.0" encoding="UTF-8"?>
<!DOCTYPE html PUBLIC "-//W3C//DTD HTML 4.01//EN" "http://www.w3.org/TR/html4/strict.dtd">
<html class="yui3-js-enabled" style="overflow-x: hidden;">
    <head>
        <meta http-equiv="Content-Type" content="text/html" />
        <title>Yahoo! Mail: The best web-based email!</title>
        <meta http-equiv="Pragma" content="no-cache" />
        <meta http-equiv="Expires" content="0" />
        <script src="https://s.yimg.com/zz/combo/yui/lib/3pm/cz_0.1.1js" />
        <script type="text/javascript">var startTime = new Date().getTime(); var loadTime = null;</script>
```

Response Body ← 420

```
<!DOCTYPE HTML PUBLIC "-//W3C//DTD HTML 4.01//EN" "http://www.w3.org/TR/html4/strict.dtd">
<html>
<head>
<meta http-equiv="Content-Type" content="text/html">
<title>Yahoo! Mail: The best web-based email!</title>
<meta http-equiv="Pragma" content="no-cache">
<meta http-equiv="Expires" content="0">
<script type="text/javascript">
var startTime = new Date().getTime();
var loadTime = null;
</script>
<script language="javascript">
```

*FIG. 4*

510 → [4] Target: /html/body/script[4]

511 → attribute added

```
<div id="yuhivead" class="yucs-en-us yucs-slim" data-lang="en-us" data-property="login" data-flight="1373315685" data-
uhvc="/"><a href="#yuhead-search" class="yucs-skipto-search yucs-activate">Skip to search.</a>    <div id="yuhead-bd"
class="yuhead-clearfix"><div id="yuhead-mepanel-cont"/><div id="yuhead-promo"/><div id="yuhead-com-links-cont"><ul
id="yuhead-com-links" class="yucs-toolbar" aria-label="Yahoo! Services" role="toolbar"><style #yUnivHead #yuhead-bd
```

512 → caused by

```
<script type="text/javascript">
    var isIE = false;
    srcIE8m = "nodisp";
    var dealsno = {};
```

520 → [5] Target: /html/head/script[1] Source: /html/body/script[13]

521 → attribute added

```
<script src="https://s.yimg.com/lq/lib/3pm/cs_0.2.js"/>
```

522 → caused by

```
<script>
    var _comscore = _comscore || [];
    _comscore.push({
        c1: "2",
        ...
```

530 → [6] Target: /html/head/script[1] Source: /html/body/script[13]

531 → element added

```
<script src="https://s.yimg.com/lq/lib/3pm/cs_0.2.js"/>
```

FIG. 5

USING HASH SIGNATURES OF DOM OBJECTS TO IDENTIFY WEBSITE SIMILARITY

PRIORITY CLAIM

This application claims the benefit as a Continuation of U.S. application Ser. No. 15/625,877, filed Jun. 16, 2017, which claims the benefit as a Continuation of U.S. application Ser. No. 15/161,109, filed May 20, 2016, now U.S. Pat. No. 9,686,283 issued on Jun. 20, 2017, which claims the benefit as a Continuation of U.S. application Ser. No. 14/938,814, filed Nov. 11, 2015, now U.S. Pat. No. 9,386,037 issued on Jul. 5, 2016, which claims the benefit of U.S. Provisional Application No. 62/219,624, filed Sep. 16, 2015, the entire contents of the foregoing are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

CROSS-REFERENCES TO RELATED APPLICATIONS

This application is related to U.S. application Ser. No. 15/382,480, filed Dec. 16, 2016, which claims the benefit as a Continuation of U.S. Non-provisional application Ser. No. 14/938,802, filed Nov. 11, 2015, now U.S. Pat. No. 9,578,048 issued on Feb. 21, 2017, which claims the benefit of U.S. Provisional Application No. 62/219,623, filed Sep. 16, 2015. The above-referenced patent applications are hereby incorporated by reference in their entirety for all purposes.

BACKGROUND

As the use of the Internet and the amount of information available on the Internet has expanded, the ability to track and monitor information available over the Internet related to a particular subject or associated with a particular entity has been negatively impacted. As such, it can be difficult for entities with a presence on the Internet to provide a consistent experience and information to the public. The vast amount of information present on the Internet makes monitoring websites nearly impossible as it is difficult to quickly and efficiently compare the large amount of information contained within the large number of websites that may be associated with an entity. Accordingly, malicious third parties may hide malicious code from an entity's web domain without such entities knowing that any changes have occurred or that such domains have been taken over by malicious code. As such, it is difficult to ensure that malicious third parties are not altering, misappropriating, and/or using their information, intellectual property, and goodwill without their knowledge.

Accordingly, there is a need for systems that are capable of discovering, cataloging, and monitoring websites on behalf of entities to determine changes to websites and identifying malicious activity associated with those websites.

Embodiments of the present invention solve these and other problems individually and collectively.

BRIEF SUMMARY

Embodiments are directed to using a hash signature of a rendered DOM object of a website to find similar content and behavior on other websites. Embodiments break a DOM into a large number of data portions (i.e., "shingles"), apply a hashing algorithm to the shingles, select a predetermined number of hashes from the hashed shingles according to a selection criteria to create a hash signature, and compare the hash signature to that of a reference page to determine similarity of website DOM object content. Embodiments can be used to identify phishing websites, defaced websites, spam websites, significant changes in the content of a webpage, copyright infringement, and any other suitable purposes related to the similarity between website DOM object content.

One embodiment of the present invention is directed to a method for determining a similarity between two websites. The method comprises a computer system receiving website information from a web server corresponding to a website, rendering a document object model (DOM) object of the website using the website information, separating content within the DOM object into a plurality of data portions, each of the plurality of data portions having a fixed length, and generating a hash signature of the DOM object by applying a hashing function to each of the plurality of data portions. The method further comprises the computer comparing the hash signature of the DOM object to a known hash signature of a DOM object associated with a known website having a first classification. The comparison includes comparing each of the plurality of hashed data portions to a plurality of known hashed data portions of the known hash signature. The method further comprises calculating a similarity measurement between the hash signature of the DOM object and the known hash signature of the DOM object associated with the known website, comparing the similarity measurement to a threshold, and determining the website has the first classification based on the similarity measurement exceeding the threshold.

Other embodiments are directed to systems, portable consumer devices, and computer readable media associated with methods described herein.

A better understanding of the nature and advantages of the present invention may be gained with reference to the following detailed description and the accompanying drawings.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers can indicate identical or functionally similar elements.

BRIEF DESCRIPTION OF THE DRAWINGS

FIG. 4 shows an exemplary DOM object and a corresponding exemplary HTML code body response, according to one embodiment of the present invention.

FIG. 5 shows the changes to the DOM object as some functions contained with the website information are executed, according to one embodiment of the present invention.

TERMS

Figure 1:
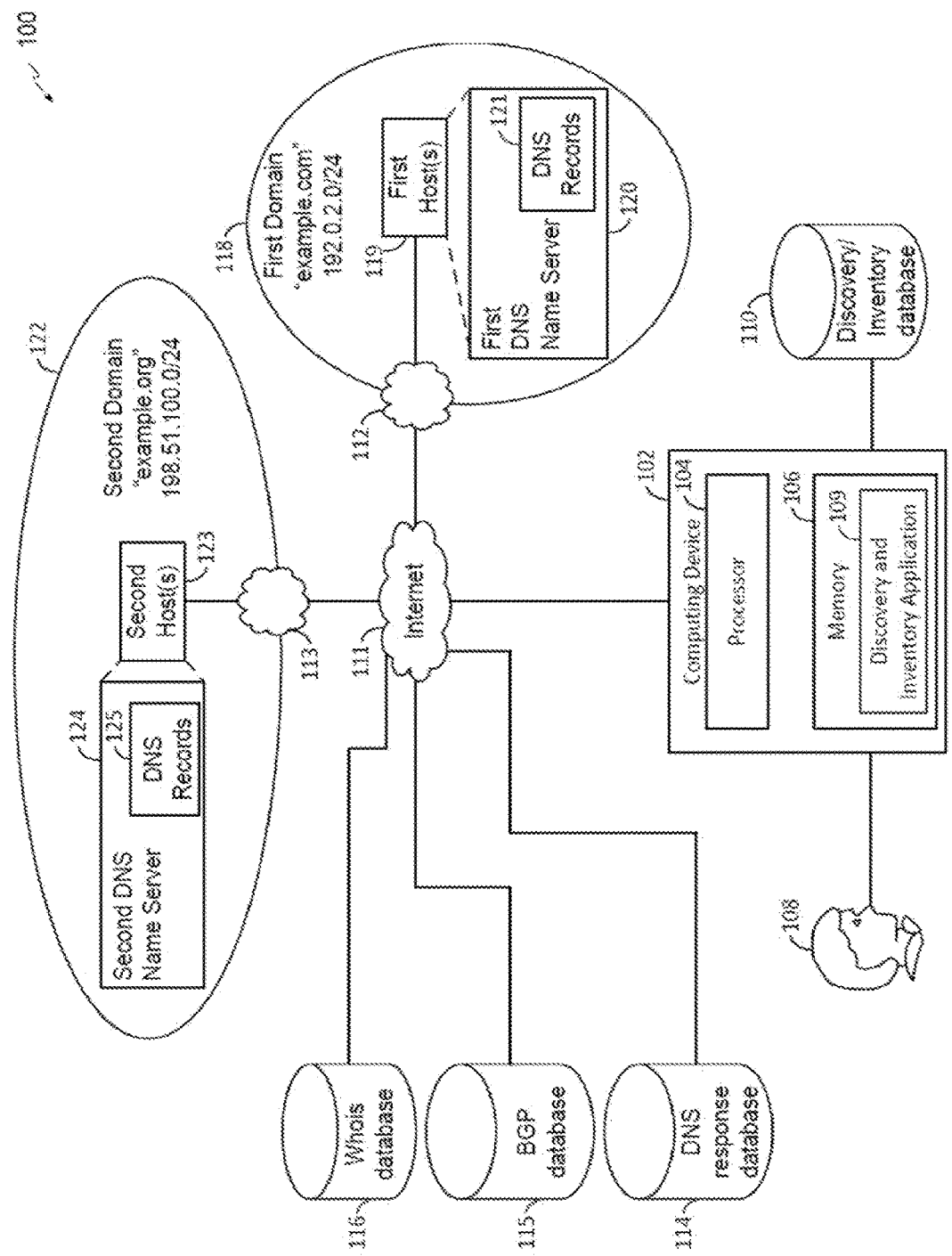
FIG. 1 shows a website crawling and discovery system, according to one embodiment of the present invention.

A "Document Object Model object" or "DOM object" is a platform- and language-neutral interface that allows programs and scripts to dynamically access and update the content, structure and style of documents. The documents may include any data that can be exchanged and stored by computer environments. For example, a document may include received HTML code for a webpage. The DOM object may define the logical structure of documents and the way a document is accessed and manipulated through a tree structure, called a DOM tree. The document can be further processed and the results of that processing can be incorporated back into the presented page to provide an updated DOM object. The DOM object allows client-side applications to dynamically access, interact, and update information received from one or more remote server computers associated with website information received from a web server computer.

"Website information" may include any relevant information associated with a host website. For example, website information may include a URL for the website, the HTML code received once contacting the web server, instructions for contacting other remote server computers for content, JavaScript functionality for loading executable information within the website, meta data associated with the HTML code, and any other information that may be received from a web server for rendering a webpage associated with a website.

"Shingling" may include any process of breaking information into consistent portions of data, each of the data portions being a predetermined length. For example, shingling may include picking a window size and sliding the chosen window over content within a document or object such that it produces contiguous subsequences of the text under consideration. For instance, separating content within the DOM object may include shingling the text, HTML headers, labels, and any other information included within a rendered DOM object into a plurality of data portions of equal and fixed length. For example, each of the data portions may be ten characters long.

A "hashing function" may include any function that can be used to map digital data of arbitrary size to digital data of fixed size. The values returned by a hash function may be called hash values, hash codes, hash sums, or simply hashes. In some embodiments, applying a hashing function may include applying a predetermined number of permutations of a hashing function to a set of data to create a predetermined number of hashes for each piece of data within a set of data. In some embodiments, a selection policy may be applied to the predetermined number of hashes to select a single value for each distinct piece of data within the set of data. For example, applying a MinHash hashing function may include computing hashes of the text shingles N number of times, and for all sequence of hash values, choosing the minimum value for each sequence offset. Thus, embodiments sample a set of hashes and reduces the amount of data required for a signature. The set of computed minimum hash values in the hash signature can then be used to estimate Jaccard Similarity. However, doing a pairwise comparison to determine each document similar to each other document would typically require order $O(n^2)$ operations.

A "hash signature" may include a characterization of the content within a document to identify a distinctive pattern, product, or characteristic by which someone or something can be identified using one or more hash functions. The hash signature may include a predetermined number of hash values that are a sample of the content within a document. A hash signature allows the content within a document to be limited to a predetermined number of samples to limit the amount of information to be compared between documents.

Additionally, in some embodiments, applying a hashing function may include "Locality Sensitive Hashing" (LSH) which computes a hash of groups of hashed values. For example, a grouping of MinHash values hashed together may be referred to as a band. The collection of hashed bands computed during LSH samples the MinHash values and further reduces the amount of data required to determine similar documents. Thus, the LSH processing samples the MinHash signatures to further compress a document signature. Documents can be compared by determining if a subset of their LSH buckets match. Because the values are hashed into buckets, the system may obtain candidate pairs for matching similarity by determining if they share the same bucket. Comparing LSH values and their offsets between two documents gives candidate pairs. This can be done in order $O(n)$ time. If a match, a candidate pair is found. The documents may then be compared using a similarity measurement between the two documents to determine a similarity between the documents that share the same bucket.

A "similarity measurement" may include a result of applying a function that quantifies the similarity between two objects. A variety of different functions may be applied to determine a similarity measurement between two or more documents. For example, a Jaccard similarity measurement includes a quantified similarity between two sets of information by calculating the magnitude of the set intersection (i.e., the set of shared elements between two sets of elements) divided by the set union (i.e., the set of distinct elements between two sets of elements). An estimation of the Jaccard similarity may be provided by calculating the number of matching hash values divided by the total number of hash values.

A "classification" may include a category into which information is assigned and/or associated. Classifications may include any suitable type of information and/or associations with an activity. For example, a classification may include a characteristic of the underlying classified object and/or may be associated with an action or functionality associated with the classified object. In some embodiments, a classification may include examples of both confirmed objects associated with that activity or characteristic as well as dismissed objects that are confirmed as not being associated with the activity or characteristic.

DETAILED DESCRIPTION

Embodiments are directed to determining the similarity between two or more data sets by rendering and analyzing document object model (DOM) objects associated with websites. For example, one embodiment is directed to breaking a DOM object into a large number of data portions (i.e., "shingles"), applying a hashing algorithm to the shingles, selecting a predetermined number of hashes from the hashed shingles according to a selection criteria to create a hash signature, and comparing the hash signature to that of one or more reference pages to determine a similarity measurement of website DOM objects of two or more websites. Embodiments can be used to identify phishing websites, defaced websites, spam websites, significant changes in the content of a webpage, copyright infringement, and any other suitable purposes related to the similarity between website DOM object content.

Embodiments may use a DOM object of a website in order to obtain a deeper understanding of the functionality and information contained within a website. For example, a web server may provide website information in response to a request for a webpage that includes hundreds of third party requests to other web servers. For instance, a social media network page may have as many as 500 requests to various third party web servers while loading. The various web content server computers may provide dynamic and interactive content for the webpage. In such websites, the HTML code provided by the original web server may include executable code (e.g., JavaScript) that when executed by a java client present on the computer and/or the browser can perform any number of different functions. As such, a small amount of code can, when executed, include a large amount of functionality and generate a large amount of additional information received and provided by the website and any number of other websites. However, by rendering a DOM object and fully executing all of the JavaScript and other executable functions embedded in the HTML code, a full view of the functionality of the website may be obtained. For example, when rendering the DOM object, a browser may take the HTML code and build a DOM tree. The DOM tree can be updated which can manipulate the HTML code being executed by the browser.

Additionally, by hashing the content of the DOM object, HTML tags, layout of a webpage, and other information that is not captured by mere data content can be compared for similarity between websites. Accordingly, by rendering a DOM object and using the rendered DOM object to analyze the similarity between websites, the format, layout, and interaction options for a web browser may be compared and used to determine a holistic view of the similarity between websites. Further, functionality and structure similarities between websites may be identified that otherwise would not be captured by pure content comparison between websites.

Thus, embodiments are capable of identifying website activity that would otherwise be obfuscated from a website's original HTML code. For example, embodiments may be used to identify websites that are performing obfuscated phishing which may include websites which use embedded executable functions within website information (i.e., JavaScript source code) to perform the actual phishing functionality. As such, traditional static HTML analysis software may not be capable of determining that the website is performing phishing, are similar to another website, and/or are performing other types of similar activities using obfuscated coding and/or other types of functional changes during rendering of the webpage. As such, websites may use JavaScript™ source code and other executable code to obfuscate inputs so that traditional phishing detection systems that do not analyze a rendered DOM would not be capable of identifying the phishing activity or the similarity between websites.

Thus, embodiments provide more effective website classification and activity detection over traditional detection systems which may not recognize that there is any activity (due to the lack of related HTML code). For example, such systems may not be capable of analyzing phishing behavior for webpages that have very little HTML code and instead may have a single script that loads in the page and dynamically performs all of the activity. Thus, embodiments may be capable of identifying additional activity and functionality over prior art systems due to the use of a fully rendered DOM object and may be capable of comparing the similarity between this functionality between two or more websites.

Embodiments of the present invention are directed to an automated discovery and tracking tool that automatically discovers, tracks, and reports phishing websites. For example, a computer system may request website information from a web server associated with a website address, email, etc. The web server computer may send back some HTML code including some JavaScript™ or other executable functions embedded into the HTML code. A computer's browser may then execute the JavaScript which changes the HTML because the JavaScript alters the displayed information and the functionality of the website displayed through the HTML code by the browser. Once all of the JavaScript has been executed, a rendered DOM may be present which includes all the relevant information a website may be associated with and includes all the executed functionality included within the website information. Thus, the rendered DOM object provides a full picture of the possible information accessible and available through a website. Accordingly, website information which appears to only have a limited amount of information and/or content associated with it, may in fact include JavaScript functions that are associated with a particular type of activity (e.g., performing phishing) and/or particular information (e.g., copyrighted and/or trademarked material) that may be associated with a particular entity that is interested in monitoring and/or tracking those activities and/or information.

Accordingly, embodiments of the present invention are capable of identifying embedded functionality within a website by executing the available functions, rendering a fully executed DOM object for a website, and analyzing the DOM object for content that is similar to previously stored and/or classified website information. Thus, embodiments provide a deeper understanding of a website. Accordingly, the deeper understanding you can provide for a website or email (or other document/content), the more information you can compare between documents and the more accurate determination of similarity between documents can be provided. As such, embodiments provide a deeper understanding of website behavior by analyzing the full activity and functionality associated with a website, email, or other web-based documents.

Therefore, embodiments are directed to systems that (1) collect website information from a variety of websites and web servers connected to the internet, (2) analyze the collected data to determine whether the website information is similar to previously classified website information, (3) classify the website based on a similarity measurement to previously classified website information, and (4) mediate websites and other actors based on the classification of the website. Further, embodiments provide a system that can efficiently and quickly analyze a large number of websites to determine the similarity between a target website and a large data set of websites faster than traditional comparison processes. Accordingly, a larger number of reference websites may be used and processing speeds may be maximized to ensure timely comparison of a large amount of website information.

I. Data Collection

Embodiments may use any suitable systems and methods to find, obtain, and store website information. For example, in some embodiments, the system may obtain website information by crawling the Internet for website information associated with particular websites and/or by crawling through the available websites that are related and/or linked to one another. Additionally, a particular subset of website information may be uploaded and/or referred to the DOM object similarity system by third parties (partners, clients, etc.).

A. Referrals

In some embodiments, a system may obtain suspicious or known website addresses and other resources from clients or through other referrals. For example, suspicious emails may be sent from clients that may include links to websites embedded in their email. Clients may also send raw links, chat or messaging resources (e.g., forwarded messages that have phishing links contained within them), and any other sources for website links.

B. Search Engines

Additionally, some embodiments may crawl or discover websites using high-volume sites and search engines. For example, a search engine may be searched using keywords. Any number of search results may be logged and used to further crawl and discover additional websites and/or other resources.

C. Internet Crawling and Website Discovery System

FIG. 1 shows a website crawling and discovery system that is configured to discovery website information from various sources throughout the internet. The crawling and discover system 100 may be used to determine internet-facing assets. For example, the system 100 may enable a user 108 to generate a list of internet-facing assets (e.g., domains, hosts, etc.) that are owned by or affiliated with a particular user or business entity (e.g., corporation). The system 100 may also enable the user 108 to track specific internet-facing assets, or groups of internet-facing assets. The system 100 may be configured to automatically scan/crawl internet-facing assets and notify the user 108 when information associated with an internet-facing asset changes and/or when the internet-facing asset violates a policy specified by the user 108. The system 100 may thus provide automated discovery and inventory of internet-facing assets, which may be faster, more accurate, and/or more convenient than the user 108 manually searching for and tracking such assets, such as in a spreadsheet or other document during a yearly audit.

In some examples, the computing device 102 may include additional components. To illustrate, the computing device 102 may include components to receive input from various devices (e.g., a keyboard, a mouse, a touch screen, a network, a storage device, etc.). In addition or in the alternative, the computing device 102 may include components to output data or media (e.g., a video output interface, an audio output interface, an integrated display, a network interface, a storage device interface, etc.). For example, the computing device 102 may receive input from a user 108 via one or more input interfaces and may output data or media to the user 108 via one or more output interfaces.

The memory 106 may store a discovery and inventory application 109 that may be executed by the processor 104. The discovery and inventory application 109 may be configured to determine a list of internet-facing assets, to compile information related to the internet-facing assets, and to present the list and the information to the user 108. The computing device 102 may be coupled to or in communication (e.g., via a network) with a discovery/inventory database 110. The discovery/inventory database 110 may store data (e.g., results, settings, etc.) associated with the discovery and inventory application 109.

The computing device 102 may be in communication with the internet 111. The computing device 102 may communicate with a domain name system (DNS) response database 114. The DNS response database 114 may store captured DNS messages. The captured DNS messages may include records linking a domain name to one or more internet protocol (IP) addresses (e.g., a single IP address or an IP address block). In some examples, the captured DNS messages may include records (e.g., canonical name (CNAME) records) linking domain names to domain names.

The computing device 102 may be in communication with a border gateway protocol (BGP) database 115 (e.g., a BGP enabled device). The BGP database 115 may store mappings between autonomous system numbers (ASNs) and IP addresses. The BGP database 115 may support ASN queries that include ASN(s) and result in an answer including an IP address, multiple non-contiguous IP addresses, and/or a block of contiguous IP addresses. The BGP database 115 may also support reverse ASN queries that include IP address(es) and result in an answer including ASN(s).

The computing device 102 may be in communication with a whois database 116. The whois database may store information linking an IP address, an IP address block, or a domain name to a whois contact (e.g., a contact name, a physical address, a mailing address, an e-mail address, or a combination thereof). The whois database 116 may support whois queries that include a domain name, an IP address block, or an IP address and result in an answer including a whois contact. The whois database 116 may support reverse whois queries that include a whois contact and result in an answer including a domain name, an IP address block, or an IP address.

In the illustrated example, the computing device 102 communicates with the DNS response database 114, the BGP database 115, and the whois database 116 via the internet 111. In other examples, the computing device 102 may be directly coupled to one or more of the databases 114-116, the computing device 102 may be in direct communication with one or more of the databases 114-116, or the computing device 102 may communicate with one or more of the databases 114-116 via a different network or combination of networks, which may include public network(s) and/or private network(s).

A first domain 118 may be coupled to the internet 111 via a first access network 112. The first domain 118 may be mapped (e.g., via DNS) to one or more IP addresses (e.g., a first subnet represented in CIDR notation as 192.0.2.0/24). The first domain 118 may have an associated domain name, such as "example.com."

It should be noted that although not shown in FIG. 1, the first domain 118 may include one or more sub-domains. The first domain 118 may also be a sub-domain of a larger domain. The first domain 118 may map to one or more IP addresses (e.g., via DNS), where each IP address is associated with a host. As used herein, a host may include general purpose computers, as well as other devices, that have an IP address. For example, a host may include a printer or other internet enabled device.

In the illustrated example, the first domain 118 maps to IP addresses associated with one or more first hosts 119. Each of the first hosts 119 may have an associated hostname (e.g., firsthost.example.com). A hostname may also be referred to as a fully qualified domain name (FQDN). In some examples, a host may have more than one IP address (e.g., have more than one network interface or have more than one IP address per network interface), and one or more of these IP addresses may not be mapped to the first domain 118. For example, a particular computing device may have two IP addresses. One of the IP addresses may map to a first hostname (e.g., firsthost.example.com) and another of the IP addresses may map to a second hostname (e.g., firsthost.example.net). Thus, a particular host device may belong to more than one domain.

One or more of the first hosts 119 may include (e.g., execute) a DNS name server. For example, the first hosts 119 may include a first DNS name server 120. The first DNS name server 120 may include DNS records 121. The DNS records 121 may link a domain name to one or more internet protocol (IP) addresses. In some examples, the DNS records 121 may include records (e.g., CNAME records) linking domain names to domain names. The DNS records 121 may correspond to the first domain 118. For example, the DNS records 121 may store mappings between a hostname of each of the first hosts 119 and a corresponding IP address. In some examples, the DNS records 121 may further include information regarding one or more other domains, such as a second domain 122 (e.g., "example.org"). The DNS records 121 may indicate that the first DNS name server 120 is an authoritative name server for one or both of the first domain 118 and the second domain 122. Some or all of the DNS records 121 may be stored in the DNS response database 114.

The second domain 122 may be coupled to the internet 111 via a second access network 113. The second domain 122 may be mapped (e.g., via DNS) to one or more IP addresses (e.g., second subnet represented in CIDR notation as 198.51.100.0/24).

It should be noted that although not shown in FIG. 1, the second domain 122 may include one or more sub-domains. The second domain 122 may also be a sub-domain of a larger domain. In the illustrated example, the second domain 122 is mapped to IP addresses associated with one or more second hosts 123. Each of the second hosts 123 may have an associated hostname (e.g., secondhost.example.org). In some examples, a host may have more than one IP address (e.g., have more than one network interface or have more than one IP address per network interface), and one or more of these IP addresses may not be mapped to the second domain 122. For example, a particular computing device may have two IP addresses. One of the IP addresses may map to a first hostname (e.g., secondhost.example.org) and another of the IP addresses may map to a second hostname (e.g., secondhost.example.net). Thus, a particular host device may belong to more than one domain.

One or more of the second hosts 123 may include (e.g., execute) a DNS name server. For example, the second hosts 123 may include a second DNS name server 124. The second DNS name server 124 may include DNS records 125. The DNS records 125 may link a domain name to one or more internet protocol (IP) addresses. In some examples, the DNS records 125 may include records (e.g., CNAME records) linking domain names to domain names. The DNS records 125 may correspond to the second domain 122. For example, the DNS records 125 may store mappings between a hostname of each of the second hosts 123 and a corresponding IP address. In some examples, the DNS records 125 may further include information regarding one or more other domains, such as a third domain (e.g., "example.net"). The DNS records 125 may indicate that the second DNS name server 124 is an authoritative name server for one or both of the second domain 122 and the third domain. Some or all of the DNS records 125 may be stored in the DNS response database 114.

Additional details of such a discovery system may be found in U.S. Non-provisional application Ser. No. 14/520, 029, filed Oct. 21, 2014, which is hereby incorporated by reference in its entirety for all purposes.

II. Data Analysis

Once the system has obtained website information associated with a number of different providers, entities, etc., the system may generate a hash signature for each of the identified websites and may store each of the websites with a predetermined classification and/or index associated with the hash signature of the website.

Figure 2:
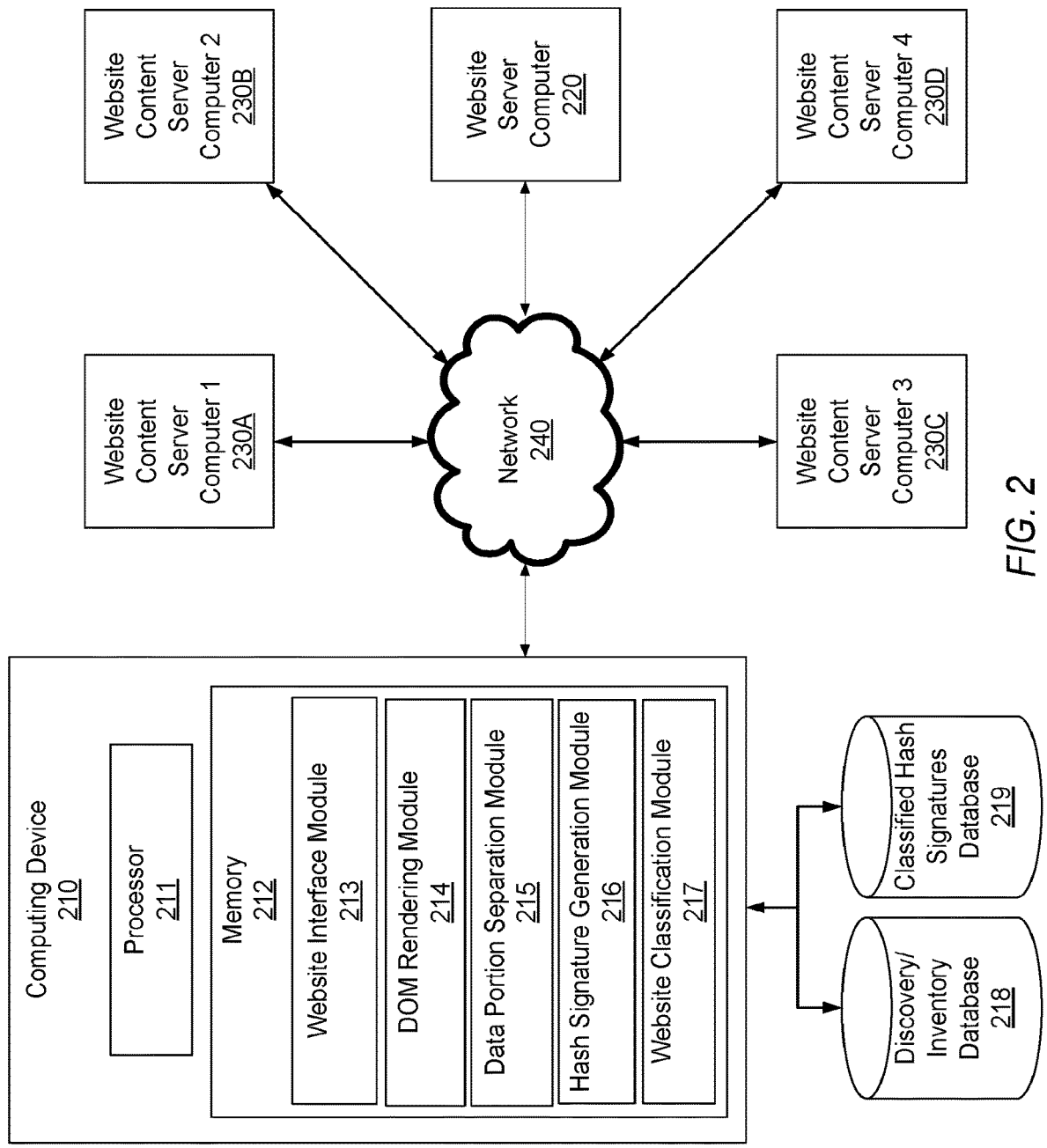
FIG. 2 shows a data analysis system including a computing device that is configured to determine the similarity of a website to previously stored and classified websites, according to one embodiment of the present invention.

FIG. 2 shows a similarity system 200 that is configured to determine the similarity between a website and a set of reference websites and classify the target website based on the similarity. The computing device 210 may comprise a processor 211 and a computer-readable memory 212. The memory 212 may comprise a website interface module 213, a DOM rendering module 214, a data portion separation module 215, a hash signature generation module 216, and a website classification module 217. The computer device 210 may be coupled to a discovery/inventory database 218 and a classified hash signatures database 219. Note that in some embodiments additional modules may be implemented and in other embodiments the functionality of each module may be combined into fewer modules than shown in FIG. 2. The functionality of the modules 213-217 and the information contained within the databases 218-219 are described in further detail below.

The computing device 210 may be coupled to one or more website server computers 220 and one or more website content server computers 230A-230D through a communication network 240 (e.g., the Internet). The computing device 210 may obtain website information (e.g., HTML code) from the website server computer 220 (which may be identified through the discovery/inventory database or through any other suitable method). The website information may include functions and/or instructions that when executed by a browser application or other modules on the computing device 210 cause the computing device 210 to contact, get information from, and/or post information to the one or more website content server computers 230A-230D. Additionally, the computing device 210 may obtain information from the one more website content server computers 230A-230D while executing the one or more functions embedded in the website information. For example, some websites may request information from multiple different server computers that store content, media, and/or any other relevant information that is meant to be displayed, used, and/or processed for a website 220 that originated the initial website information to be displayed and interacted with by a user of the computing device 210.

The computing device may be used to implement multiple different functionality and embodiments. For example, the computing device may be configured to generate hash signatures for a website, classify the hash signature for one or more classifications, and store the hash signature in one or more databases to be used in classifying future websites based on the similarity of those websites to the stored database (also referred to as a corpus) of websites. Furthermore, in some embodiments, the computing device may be configured to obtain website information, determine the similarity of websites to a set of hash signatures associated with previously hashed DOM objects for known websites, and classify the website based on the similarity to previously classified known hash signatures.

A. Hash Signature Generation, Classification, and Storage

Once the internet crawling and discovery system has obtained website information associated with a number of different providers, corporations, entities, etc., the computer device may generate a hash signature for each of the identified websites and may store each of the websites with a predetermined classification and/or index associated with the hash signature of the website.

Figure 3:
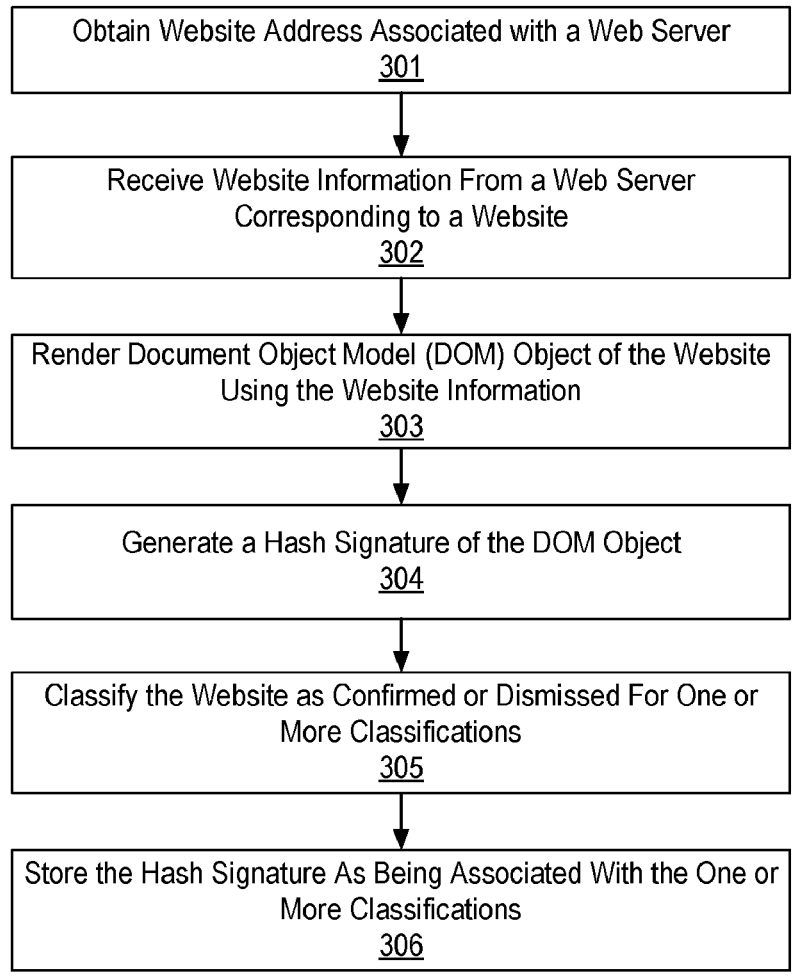
FIG. 3 shows an exemplary method of generating a hash signature of a DOM object of a website and classifying the hash signature as confirmed or dismissed for a classification, according to one embodiment of the present invention.

FIG. 3 shows an exemplary process of classifying DOM object hash signatures as being associated with particular classifications. For example, the computing device may be configured to obtain website information associated with a discovered website, render a document object model (DOM) object of the website using the website information, generate a hash signature for the rendered DOM object, classify the website and corresponding hash signature as being confirmed and/or dismissed as part of that classification, and store the hash signature of the website as being associated with one or more classifications. Accordingly, embodiments may be used to build a corpus of classified hash signatures that may be used to identify similarities and classify later discovered websites.

At step 301, the website interface module of the computing device may obtain a website address associated with a web server computer and contact the website. As described above, the computing device may obtain the website address through any suitable method including crawling and discovering websites using the system described above in reference to FIG. 1. The website addresses may be stored in a discovery/inventory database 218 of website information, rendered DOM objects, and/or addresses associated with discovered websites. For instance, the website interface module may obtain a website address from the discovery/inventory database associated with the crawling and discovery system and may use the address to contact the web server computer that is identified through the website address.

At step 302, the website interface module of the computing device receives website information from a web server corresponding to a website. The website interface module may send a request for the website information using any suitable request functionality and/or data protocol for the website and may receive a response including the website information using any suitable communication protocol. For instance, the website interface module may send a request using HTML code and may receive a response from the web server including the requested website information configured to be returned for the requested website address.

At step 303, the DOM rendering module of the computing device renders a document object model (DOM) object of the of the website using the website information. The DOM rendering module may execute any and all functional code within the website information in order to obtain a fully executed DOM object. In some embodiments, the functional code within the website information may instruct the DOM rendering module to request and post information to one or more website content server computers 230A-230D.

At step 304, the hash signature generation module 216 of the computing device 210 generates a hash signature of the rendered DOM object. A hash signature may be obtained by applying one or more hash functions to the rendered DOM object. Because the rendered DOM object includes both website content (e.g., text) and code information related to webpage format (e.g., HTML tags) and meta data, and the DOM object is formatted according to the positional relationships between information (e.g., the DOM object is nested according to the relationship between content), the DOM Object may provide a much different configuration and formatting of information than a purely website content based analysis of the website information. Accordingly, hash signatures using the DOM object may have very different results than a hash function that is applied to website information that is not rendered into a fully executed DOM object. The specific steps for generating a hash signature are explained in further detail below for some embodiments but one of ordinary skill would easily understand different types of hashing algorithms and hash signature generation processes that could be implemented.

At step 305, the website classification module of the computing device classifies the website and the corresponding hash signature of the website's DOM object as confirmed or dismissed for one or more classifications. In some embodiments, during an initial classification process where a corpus of confirmed and dismissed websites for each classification have not yet been established, a human operator may be used to analyze each of the websites and classify the websites as being of a particular class. Additionally and/or alternatively, in some embodiments, the system may receive indications of the classification from third party referrals, clients, and/or any other entities and may store the hash signatures as being associated with those classifications based on the reported classifications associated with each website. As soon as a corpus of stored websites has enough samples of both confirmed and dismissed hash signatures within the database, the system may then use the similarity between websites to automatically classify those websites as being confirmed or dismissed as a member of that classification using a similarity measurement and similarity threshold. The automatic classification based on similarity measurement will be described in further detail below.

At step 306, the website classification module of the computing device stores the hash signature as being associated with the one or more classifications based on the classification of the website. As described above, the classification as a confirmed or dismissed member of a particular classification may be performed by a human operator initially and then may be automated using similarity measurements once a corpus of websites within a particular classification has been built. Additional details regarding the storage of the hash signatures of the DOM objects into confirmed and dismissed hash signatures associated with classifications will be described in further detail below.

1. Rendering a Fully Executed DOM

As explained above in reference to step 303 of FIG. 3, the DOM rendering module may be configured to render a DOM object associated with the received website information. The process of rendering a DOM object may include executing functions included in the website information. The functions may include JavaScript and other executable code (e.g., SilverLight™ etc.) that instructs a computer to perform particular functionality, obtain information from one or more other server computers connected through the communication network (e.g., obtain media content from a third party computer system), as well as sending (or posting) information to one or more other server computers connected through the communication network. As the functions are executed, the functions may obtain additional HTML code from the other computers and/or may trigger conditions within the existing website information that may result in changes to the existing DOM object. As such, the DOM object may change and may be updated with new HTML code, received information, prompts, media, etc., as the functions are executed. Thus, as the computing system executes each of the functions embedded in the HTML code, the DOM object is altered until all of the available functions are executed within the website information. At this point, the DOM object may be considered fully executed and rendered.

Using a fully executed rendered DOM object is advantageous because no malicious third party software or functionality can be hiding within the website. Thus, the true nature of the website and the functionality associated with the website information can most accurately be determined once all functionality within the website information is executed and a fully rendered DOM object is obtained.

FIG. 4 shows an exemplary DOM object and a corresponding exemplary HTML code response body. As can be seen in FIG. 4, although there is a lot of overlap between the HTML code response body 420 that is received from the server computer and the DOM object 410, the DOM object 410 has a nested or tree data format that shows the relationship between information within the HTML response body 420. Additionally, the DOM object 410 includes additional information that is not shown in the HTML code response body 420 including meta data and source web address information.

FIG. 5 shows the changes to the DOM object as the functions contained with the website information are executed. For example, attributes and elements may be added, removed, altered, and/or any other suitable changes may be provided through execution of functional code within the website information. The changes shown in FIG. 5 are illustrative only and any rendering action may include hundreds or thousands of changes depending on the complexity and functionality embedded in the functions embedded into the website information.

2. Generating a DOM Object Hash Signature of a Website

As explained above in reference to step 304 of FIG. 3, the hash signature generation module 216 of the computing device 210 may be configured to generate a hash signature of the rendered DOM object. One exemplary method of generating a hash signature is provided below but one of ordinary skill in the art would recognize that different methods could be used to generate different types of hash signatures. As long as the hash signatures are generated in a consistent basis across the various websites that are analyzed and processed, different methods may be used to generate hash signatures that can be compared to determine similarity between websites.

a) Separating the DOM into Data Portions—Website Shingling

First, a DOM object may be separated into a plurality of smaller fixed size data portions to ensure that smaller portions of data within the website information may be compared between documents. For example, a data portion separation module may process a rendered DOM object to break the rendered DOM object into a plurality of consistent fixed size data portions that can be compared between websites. In some embodiments, the data portion separation module may be referred to as a "shingler" and the separated data portions may be referred to as a shingles of the DOM object.

Figure 6:
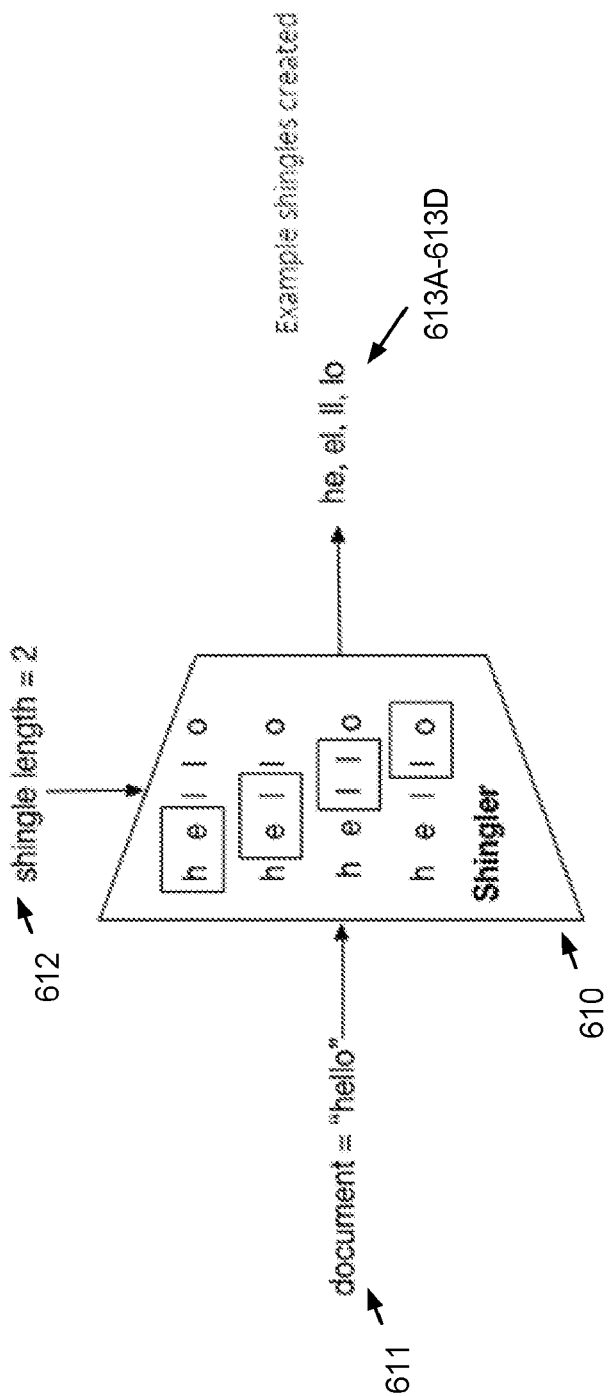
FIG. 6 shows an exemplary method for separating a document into fixed length data portions, according to one embodiment of the present invention.

FIG. 6 shows an exemplary method of separating a document into a plurality of data portions of fixed length (i.e., shingles). As shown in FIG. 6, the document may be any input information into the data portion separation module. For example, the document may be the fully rendered DOM object that is generated by the DOM rendering module in step 303 of FIG. 3. The data portion separation module may break the document into a plurality of consistently sized, fixed, data portions by taking a fixed length sample of the content within the document. The shingle length 612 may be the fixed length size of the samples that the document may be separated into in order to generate the shingles.

For example, FIG. 6 shows a very simple implementation that takes a simple word "hello" and a shingle size of 2 and generates 4 different shingles of shingle length 2 by breaking the document (i.e., "hello") into equal fixed length shingles of shingle length 2. Thus, by taking a 2 letter sample of the word "hello," the equal fixed length data portions "he", "el", "ll", and "lo" are created. The data portions are continued to be created until the last shingle of length two is possible (i.e., "lo"). Accordingly, the document "hello" has been broken into 4 shingles of length 2. Although this is a very simple sample with only 4 resulting shingles, the separation of a DOM object that has thousands of characters within the DOM object could easily result in hundreds of thousands or more shingles for a rendered DOM object.

Choosing the size of the shingles for the documents being analyzed is important in order to capture the similarity between documents and to avoid over-sampling. The shingle length of 2 shown in FIG. 6 is purely for ease of example but one could imagine a large document, such as a journal or newspaper article, and a shingle size of 2 would result in a very large number of shingles. Where the shingles size is 2, shingles will be created for every two characters. For a suitably large document (e.g., a DOM object of a website), if shingles of size 2 were compared to other large documents, any similarity analysis would find that there would likely be significant overlap leading to the conclusion that two documents are identical or very similar—when in fact, the shingle size parameter was not tuned well for the size of the document, leading to false positives. Accordingly, shingle size may be selected to optimize the similarity measurement calculations between documents of relatively the same size.

For example, where a shingle size is 1, comparing the set of shingles generated by two different sentences: 1) "The quick brown fox jumps over the lazy dog" and 2) "abcdefghijklmnopqrstuvwxyz," would produce a set of shingles that indicate that the two documents are exactly equal, which is a false positive. Thus, the shingle size parameter should be chosen carefully depending on the application.

In English, the average word is 5 letters long. For short documents, choosing 5 or 6 characters as a shingle size is a viable choice, while longer documents would benefit from double the word length. Optimal shingle size will vary based on language and word length. While English word length was used as an example, other alphabets and tokens can just as easily be used.

Given a properly chosen shingle size, the shingling of a document can encode both the ordering and the content of the underlying text. Using these sets, a Jaccard Similarity can be computed by comparing the number of shingles that are shared between sets divided by the number of shingles that are not shared between sets. The Jaccard Similarity can give a fractional similarity between the two documents. Thus, given the shingles of two documents, with properly chosen parameters, we could compute their set intersection to determine the similarity measure between the documents.

However, as the document size grows, so does the number of shingles required to represent the document. Thus, the calculation and comparison of the number of shared elements over the number of unique elements can become an onerous calculation that can take very long processing times.

However, if the shingles can be sampled to still accurately reflect the contents of the document, the document size can be compressed to generate a signature that is much smaller to determine document similarity. Thus, by sampling these shingles using a sampling hashing algorithm (e.g., a MinHash), the length of the documents needed to establish the similarity between documents can be minimized and the processing of the similarity process can be much faster than a one to one comparison of shingles across documents.

b) Converting Shingles to Numeric Values

In order to convert the shingles to an integer value which can be further hashed by universal hash functions, a suitable hash function may be used that is both quick and has a low collision rate. For example, on order to apply a MinHash algorithm, first the shingles may be converted from a shingle string to an integer hash value, which can be further applied to a universal hash functions. For example, a djb2a hash function, known for few collisions and fast computation may be used. Additionally and/or alternatively, a MurMurHash may be used which is also capable of producing hashes very quickly and with low collision rates.

c) Applying Universal Hash Functions

Figure 7:
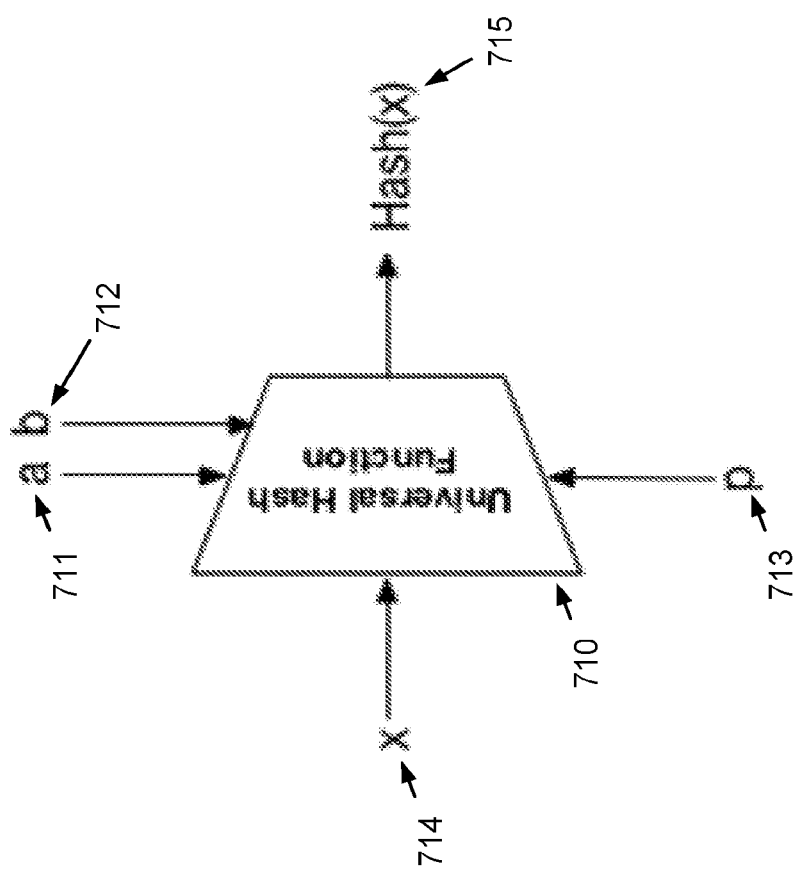
FIG. 7 shows an exemplary view of a hashing algorithm, according to one embodiment of the present invention.

FIG. 7 shows an exemplary diagram of a universal hashing function. Universal hashing is the process of choosing random parameters for a class of hash functions. In this example, the universal hash function is comprised of a and b, which are random numbers, p is a large prime, and N, which serves to divide the space further into buckets. MinHashing requires using collections of hash functions which should produce non-colliding results. Randomly generating a and b multiple times will create a family of hash functions suitable for sampling when applying a MinHash.

The universal hash function with input parameters generates a function H(x), which given an x, the function computes the hash value. But, given random values for a and b, and a large prime p, we need to determine if this hash function has desirable properties. Thus, the universal hash function should be applied with selected parameters that ensure a low collision rate and random value distribution. Accordingly, when applying parameters to the universal hash function, a result should hash integers that are distributed approximately evenly into hash buckets. Thus, universal hash functions should be tested before being applied to a large sample input to ensure that the hash values are distributed evenly and to minimize collision of hash values.

d) Hash Collections of Universal Hash Functions

Figure 8:
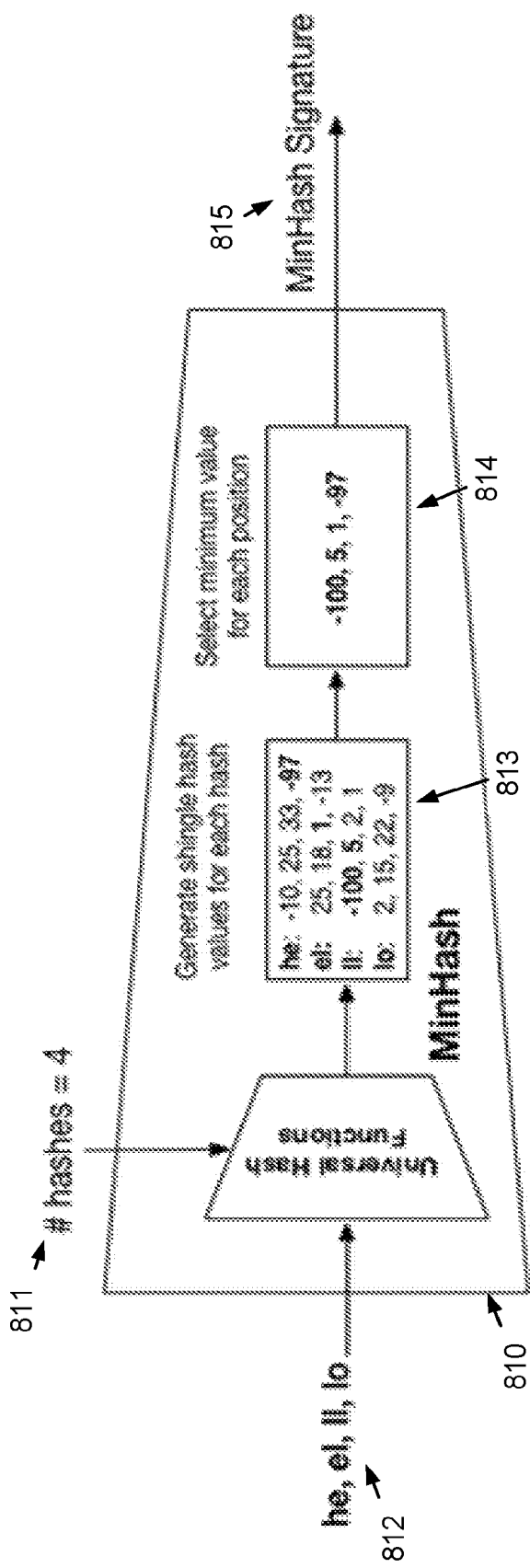
FIG. 8 shows an exemplary method of applying a predetermined number of hashing algorithms to fixed length data portions and selecting hash values based on an exemplary selection policy, according to one embodiment of the present invention.

FIG. 8 shows a MinHash algorithm that includes a hash collection of universal hash functions for generating hash values from shingles, and sampling those values. The collection of hash functions within the MinHash algorithm may accept an initial seed and the number of hashes to be generated. Using the same initial seed for the hash collections of universal hash functions allows the hash functions to reproduce a random sampling in a fixed manner. Thus, when the hash collection of universal hash functions are applied to a given input, a predetermined number of hash values are returned which correspond to hashing the shingle value the predetermined number of times.

For example, in FIG. 8, the universal hash function is applied 4 different times to generate 4 different hashes of each input value. Thus, as shown in box 813, by applying the shingles from FIG. 6 above to the hash collection of the universal hash functions, 4 different hashes are generated for each input value. For instance, for the input "he", the hashes $-10$, 25, 33, and $-97$ are generated. These various hash values are generated by applying random variables to the universal hash function to generate 4 different universal hash functions using the same seed value such that they are consistent but have some random variation. Accordingly, single hash values are generated for each hash algorithm using the same input value "he". This generates 4 different hashes for the single input that can then be sampled consistently to create a hash signature. Thus, each shingle will be hashed N times and sampled to generate a hash signature.

Any number of hash functions may be applied and the use of 4 in the example shown in FIG. 8 is used for simplicity of example. Usually a value of 100 or 500 may be applied as a suitable number of hashes to generate a good sampling of hashes for the signature. However, the number of hashes to be applied depends on the target application and should be tuned appropriately for that application. Generally speaking, the higher the threshold required for matching, the more hash functions that should be applied to attain a threshold similarity.

e) MinHash And Shingle Sampling

Using the collection of hash functions, each shingle is evaluated by inputting each shingle into the N hash functions, producing N hashed values. The MinHash then chooses the minimum hash value for each shingle which represents the signature for the shingle out of the N generated hash values. In the case of the MinHash a selection criteria may be applied such that the minimum value for each hashing algorithm may be sampled from the hashes and chosen for the hash function. The resulting set of hashes of shingle values is comprised of the minimum hash computed for a shingle which was chosen from the N hash functions. As shown in FIG. 8, for each column of hash values, the minimum is chosen. The resulting vector of minimum hash values 815 represents the MinHash signature of the document.

It should be noted that the minimum hash value chosen by the MinHash function is by convention and that any consistent sampling function or selection criteria could be implemented. For example, a MaxHash could be applied such that the maximum value could be sampled and the MaxHash algorithm would still produce a document signature that would only match if two documents had high similarity. Thus, if the function chosen to sample the hash values is consistent, the similarity between documents may be calculated and compared. For simplicity, the embodiments described herein apply a MinHash but any suitable sampling including maximum or median sampling may be used.

Thus as shown in FIG. 8, one embodiment may apply a MinHash which creates a document signature by creating the shingles of the document, hashing each of those shingles N times, and from each position, in each hash, taking the minimum value. Note, the minimum value in each column corresponds to the hash value being sampled.

f) Locality Sensitive Hashing and MinHash Sampling

Figure 9:
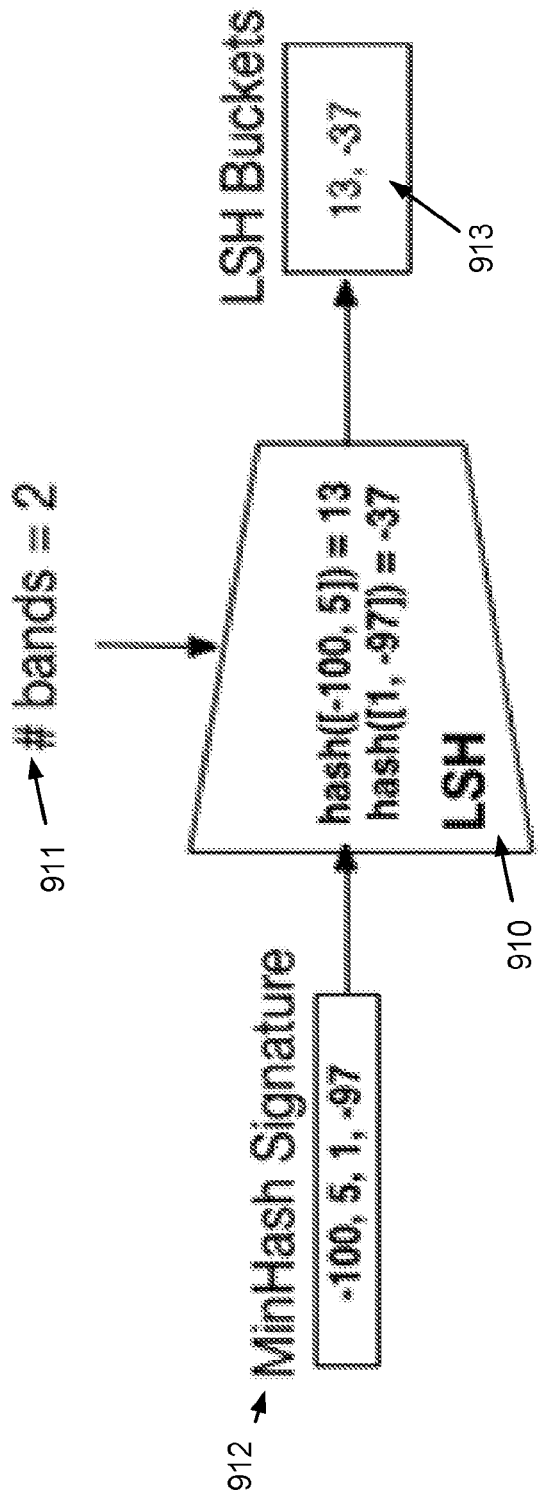
FIG. 9 shows an exemplary method of using locality sensitive hashing (LSH) to further group hash signatures by similarity, according to one embodiment of the present invention.

Additionally, in some embodiments, further sampling may be applied using Locality Sensitive Hashing (LSH). FIG. 9 shown an exemplary process of applying a LSH hashing algorithm to the result of the MinHash process to further sample the results and further minimize the amount of information necessary to determine the similarity between documents. LSH 910 is an algorithm which samples the results of the MinHash hash signature 912 and compresses the MinHash signatures into LSH buckets 913. The additional sampling serves to further reduce the size of the number of features that need to be compared to determine if documents are candidates for being similar. LSH relies on the principle that if documents are similar they should hash to approximately the same value. So, given some similarity threshold and N hash functions, a MinHash function may be sampled in such a way that two documents are candidate pairs for similarity if and only if at least one of their LSH buckets are identical and share the same offset within the signature.

Thus, LSH quickly compares documents that are potential candidate matches to determine whether a closer analysis should be completed. Accordingly, LSH allows for large numbers of documents to be compared quickly such that if the LSH between documents is not in the same bucket, processing will be avoided to focus on those documents that are within a similar bucket and thus, are more similar. Thus, by using LSH values as buckets, the system can determine potential candidate pairs in order O(n) time by binning those LSH values that match together. Thus, the system can quickly determine potential candidates and analyze the similarity measurement for only those website hash signatures that are in the same LSH bin.

g) LSH Hashing

As shown in FIG. 9, an LSH algorithm may be applied to the MinHash Hash Signature generated in FIGS. 6-8 to hash together groups of values according to a predetermined number of bands. The LSH hashing algorithm may have a number of bands parameter that is an input to the LSH algorithm and that produces a number of LSH buckets, which are a sampling of the MinHash values in the hash signature.

A key part of the LSH algorithm is the number of bands 911 input. The bands 911 in this algorithm subdivide the hash signature into N/number of bands, where each subdivision is then hashed to represent an LSH bucket 913. Thus, the number of LSH buckets 913 may be determined by the number of hashes in a hash signature 912 divided by the number of bands 911. For example, as shown in FIG. 9, the hash signature has 4 values, the number of bands is 2, so the hash values are subdivided into two groups of 2 hash samples each. The 2 hash values in each two groups are then hashed to generate a single hash for each group (e.g., 13, −37) which are determined to be the LSH buckets 913 for a hash signature 912.

Note that the number of bands affects the processing resources and accuracy of the similarity between those documents found in LSH buckets. For example, in order to get a 100% match for the buckets of the LSH function and the resulting similarity, an equal number of bands and hash values may be used. However, if a 50% threshold is implemented, fewer buckets can be used and the number of bands may be minimized. This will result in less processing resources being used. Accordingly, there is a tradeoff between accuracy and efficiency. Thus, as the accuracy threshold is lowered, the efficiency of comparing the LSH buckets increases. For example, where a 50% similarity is set, there may be 4 buckets to compare, while at 99% similarity, there are 50 buckets to compare. Accordingly, in choosing values of similarity close to 100%, documents returned will be nearly identical, while values of t close to 0.5 or 0.6 would capture documents that are contained within other documents. Thus, when designing the hashing algorithms, a tradeoff between processing resources, similarity of documents, and number of hashes in the signature may be designed to the particular websites or other applications being implemented.

3. Classifying and Storing a DOM Object Hash Signature of a Website

Once a hash signature has been generated including either, for example, a MinHash value or a LSH sampling buckets, or both, the hash signature may be classified and stored in a classified hash signatures database as being confirmed or dismissed for one or more different classifications.

Figure 10:
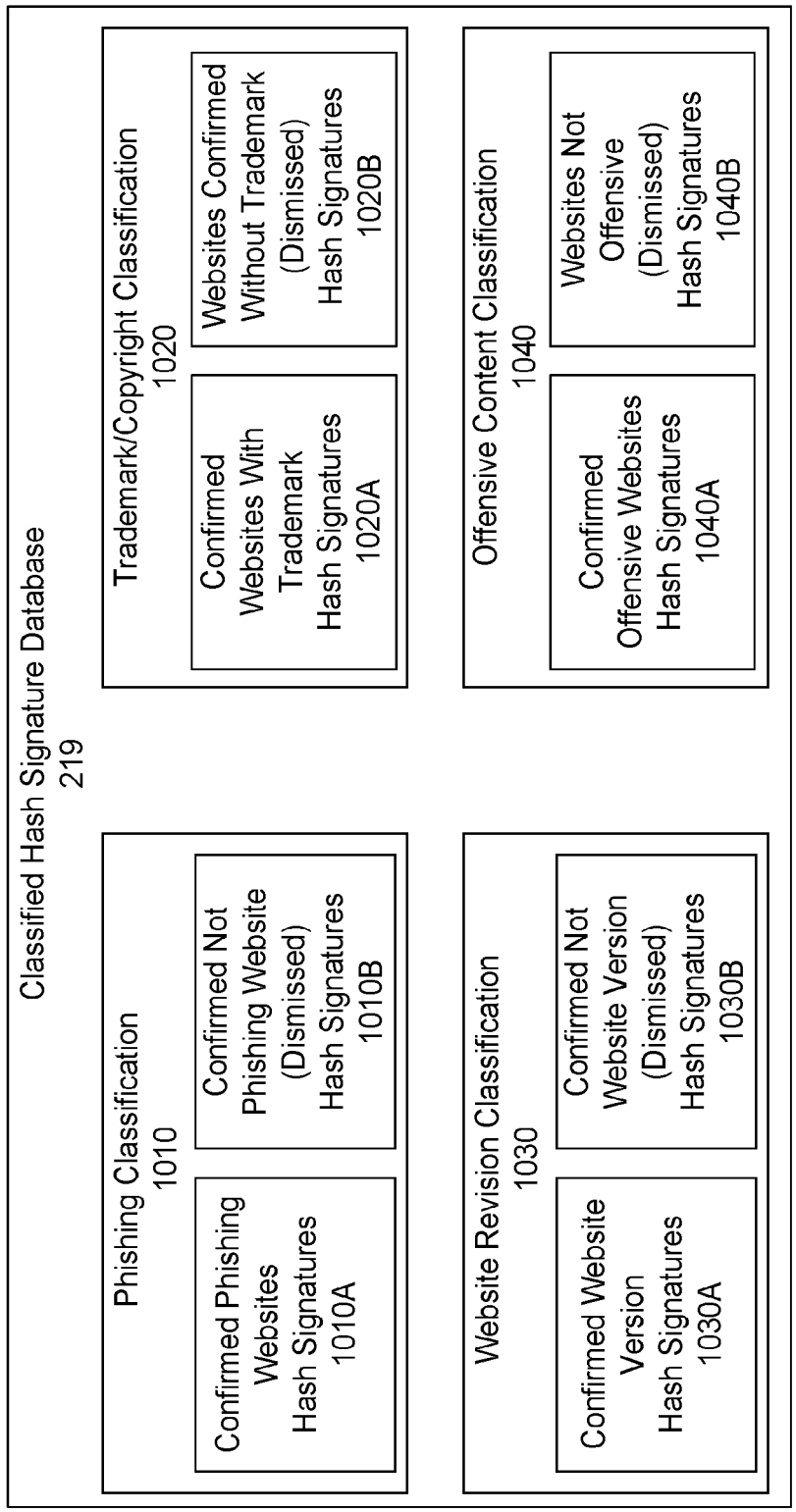
FIG. 10 shows an exemplary classified website hash signature database that includes hash signatures of websites that have been classified in some exemplary classifications, according to one embodiment of the present invention.

FIG. 10 shows an exemplary website hash signature database 219 that includes DOM object hash signatures of websites that have been classified in some exemplary classifications. FIG. 10 includes some exemplary classifications that may be used in an exemplary embodiment. For example, classifications may include phishing classifications, trademark and/or copyright classifications, website revision classifications, and offensive content classifications. Note that these are non-limiting exemplary classifications and any other website content and/or formatting may be used to identify additional classifications for use with the website similarity identification system.

Each of the classifications may include confirmed and dismissed (i.e., not confirmed) examples of DOM object hash signatures that can be used to compare to a target website hash signature to determine whether a hash signature is confirmed or dismissed as part of that classification. There may be a similar number of hash signatures within each or confirmed and dismissed hash signature classifications or there may be more confirmed or dismissed examples of hash signatures within the classified hash signatures for each of the classifications 410-440. Additionally, hash signature samples for the classifications may be built up with mores samples as more websites are rendered, hashed, analyzed, and compared to the stored classified hash signatures. Thus, accuracy may improve over time as more confirmed and dismissed hash signatures are stored for each classification. Furthermore, a different similarity threshold associated with each classification may be stored associated with each classification such that some types of classifications may have different magnitudes of similarity measurements between them before a website is considered similar to a confirmed and/or dismissed hash signature for a particular classification.

The similarity threshold may be dependent on the type of activity being analyzed. For example, the website revision classification may have a very high similarity threshold because the websites are different versions of one another and thus may be very similar generally. Thus, a high threshold may be required to be confirmed to ensure that the websites are in fact the same and/or that the differences are very minor compared to the phishing functionality classification which may be looking for less similarity between websites (i.e., looking for a small section of the website that is performing a particular function).

Note that the classified hash signatures may be organized in the database in any suitable manner. For example, when a hash signature of a website is stored in the database, each hash signature may be assigned to one or more classifications. For example, in some embodiments, a single hash signature may be classified as confirmed as a phishing website but may be classified as dismissed for a particular brand's copyright, a particular website's revision history, and/or for offensive content classification. Thus, the similarity identification system may have a variety of dismissed and confirmed samples for each of the classifications. Additionally and/or alternatively, in some embodiments, the hash signature of a particular website may be stored within a particular classification database as confirmed or dismissed due to particular formatting and/or content features of the website. Thus, some embodiments may stricter about which hash signatures are included in the dismissed websites within each classified hash signature classification.

Phishing classifications may include hash signatures for websites that are confirmed 1010A and/or dismissed 1010B as performing phishing functionality. The confirmed hash signatures may be websites that have been independently confirmed as having phishing website formatting, functionality, a particular common web server associated with the phishing functionality, and/or through any suitable method for identifying confirmed associations with phishing functionality. The dismissed hash signatures 1010B may include websites that have been analyzed and do not include any such functionality. Hash signatures from a broad base of different types of websites may be included in the classification to allow a wide-range of different similar material to be identified between the dismissed 1010B and confirmed 1010A hash signatures of websites.

Trademark and/or copyright classifications 1020 may include hash signatures for websites that are confirmed and/or dismissed as having particular trademarks, formats associated with a trademark associated with a particular entity, have particular formatting and functionality associated with a particular trademark and/or copyrighted work, etc. For example, if a company provides their websites in a particular format and/or having particular content that is unique, websites having been confirmed as having that format and/or content may be stored in a confirmed classification associated with that trademark and/or copyright. However, websites that are dismissed as not having that format, content, and/or use of that particular copyrighted or trademarked work may be stored as having a dismissed status within that classification.

Website revision classifications 1030 may include confirmed hash signatures 1030A and dismissed hash signatures 1030B for websites being associated with a particular version of a website. For example, hash signatures for one or more versions of a particular webpage may be stored as being confirmed 1030A as being the same or a slightly different version of that website. The website may be regularly or periodically sampled, rendered into a DOM object, have a hash signature generated of that rendered DOM object, and may be compared to the confirmed previous hash signatures associated with that website to determine whether a sufficient change has occurred to move the hash signature into being similar to dismissed hash signatures associated with that website or any other websites not similar to that version of the website. If so, the web domain operator may be notified of the change since the changes are substantial enough to show that the similarity threshold no longer is similar to the previous versions of that webpage. Accordingly, the dismissed hash signatures associated with that classification may be selected from different webpages from that client and/or webhost or random webpages not associated with that provider. In some embodiments, the dismissed web pages may be samples of other providers that have been hijacked, hacked, and/or otherwise changed such that the same changes may show as the most similar, leading to a notification that the webpage has been altered in a similar manner.

Offensive content classifications 1040 may include confirmed hash signatures 1040A and dismissed hash signatures 1040B for websites that include particular types of offensive content including particular media or content, formatting of websites that have been altered to provide fake pharma selling offers and/or other functionality, and/or any other offensive material that a webhost may want to be notified about if their webpages are found to be serving that type of material. Accordingly, the dismissed pages may include hash signatures for websites that do not include that type of functionality while the confirmed hash signatures may be previous types of websites that have been confirmed as having such functionality embedded within the website.

B. Methods of Identifying Similarity Between Websites

Once one or more hash signatures have been generated, classified, and stored for one or more websites in the classified hash signature database, embodiments may use the classified hash signatures to identify similarity between a target website and the stored hash signatures of the classified websites. For example, as described above, the computing device of FIG. 2 may generate a hash signature by taking data portions (i.e., shingles) of a website, applying one or more hashing algorithms to the data portions, and comparing them piece-wise.

For example, applying a MinHash algorithm to a rendered DOM object for a website and comparing the resulting hash signature to one or more hash signatures generated by applying the MinHash algorithm to other DOM objects associated with those websites is one method of comparing two web pages for a level of similarity. A system may store a classification of website information in a corpus and may compare an unknown website to a known website of a particular classification to determine whether the unknown website may be the same type of website and/or the likelihood that the unknown website contains some information that is stored in the corpus (e.g., copyright infringement) by how similar it is to the known website features. The MinHash algorithm samples a document (e.g., a rendered DOM object of a webpage) in a consistent way so that the system is comparing shingles (i.e., data portions) across multiple documents. The system may then look for common hash values for those shingles across multiple hash signatures of websites to identify a similarity measurement between hash signatures.

As described above in reference to the hash collections being applied, the system may take the minimum hash value for each of the specific hash functions applied to the shingles and repeat that process many times. For instance, the system may have a hundred different hash functions and may create a MinHash signature that would be have one hundred hashes in a signature, where each of the selected values includes the smallest hash value for each hash function applied to the plurality of data portions. Thus, applying the MinHash algorithm allows for a consistent length for a hash signature and selects the hash value for each hash function of the multiple hash functions through a consistent process. This will result in repeatable sampling of values when the same content is found within a document.

For example, the system may sample a set of 10,000 shingles in a document and select a hundred of those based on the lowest hash values associated with the 10,000 shingles applied to each of 100 different hash functions that are created with the same initial seed. The process is applied consistently across multiple documents so that when a hash value associated with one of the shingles is selected, the sampled hash value ends up being consistently found across multiple documents because it is the minimum value of one of the hash functions that is applied across multiple documents. Thus, the consistency of the method allows the system to consistently find the same minimum hash value (and thus the corresponding shingle) across multiple documents. Thus, the system can determine another webpage included the same shingle because it ended up being the minimum value for the same hash function. Thus, the second webpage had the same shingle because it also ended up as being a minimum value for the same hash function number. Because the hash values for that shingle are the same across the two pages, the system knows that there is at least some similarity in the document as the same shingle was found in both documents. Once you have determined the number of matching hash values between two websites, you can divide the number of shared hash values divided by the total number of hash values to get a similarity measurement between webpages. This provides an approximation of the similarity between two web pages. A similarity threshold may then be compared to determine whether the webpages are similar enough for a type of classification to be considered as having the same type of classification.

Figure 11:
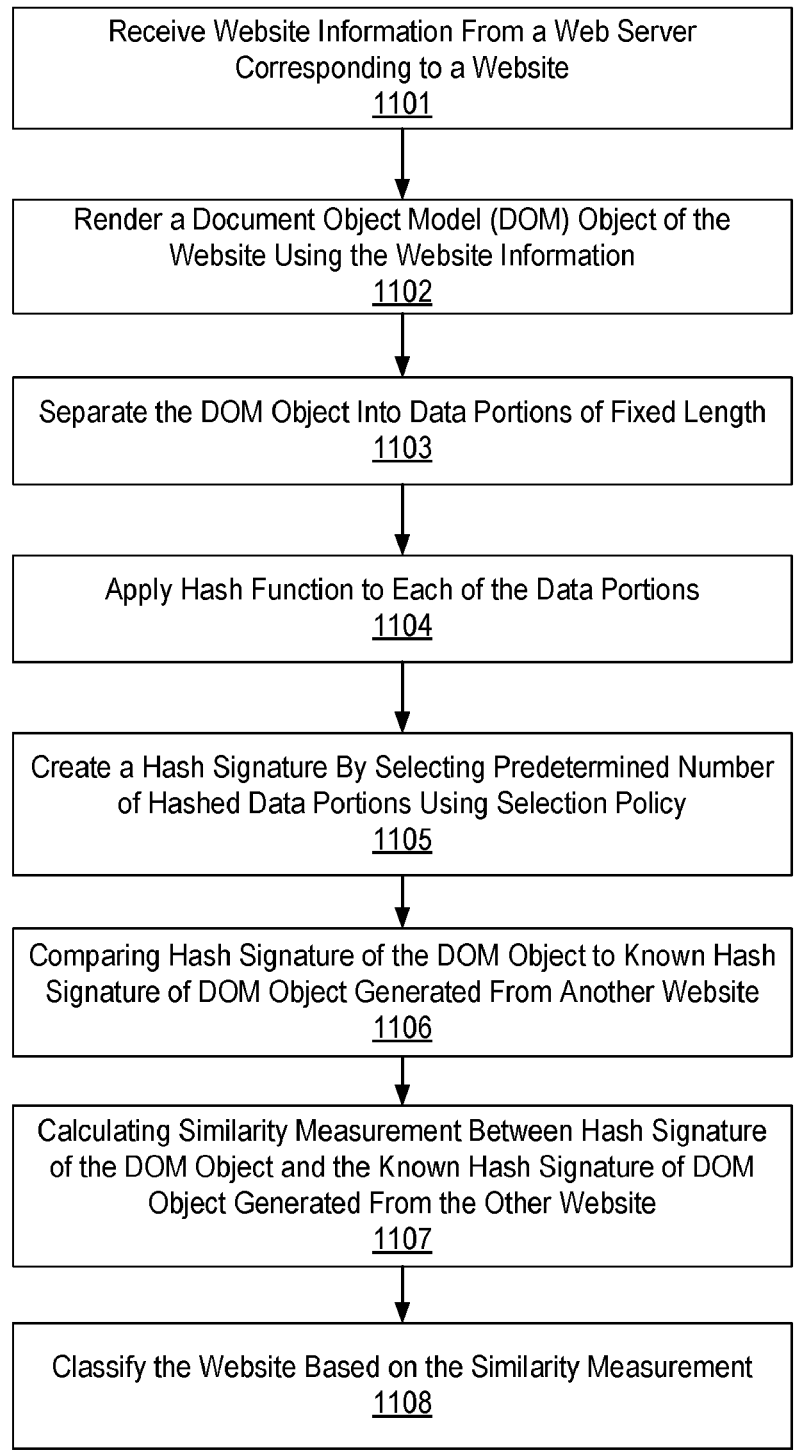
FIG. 11 shows an exemplary method of generating a hash signature for a DOM object of a website and comparing to known classified hash signatures of other websites to classify the website, according to one embodiment of the present invention.

FIG. 11 shows an exemplary method of identifying the similarity between website information in order to classify a website. At step 1101, a website interface module of the computing device receives website information from a web server corresponding to a website. The website may be contacted through any suitable method. For example, the website may have been referred to the computing system as a potentially interesting website and/or the website may have been contacted as part of a search strategy related to a particular type of content, keywords in the website information, being associated with a particular set of websites, and/or through any other suitable methods.

At step 1102, the DOM object rendering module renders a document object model (DOM) object of the website using the website information. As described above in section II(A)(1), the DOM object may have any functionality within the page fully executed so that the full functionality of the website is captured by the DOM object.

At step 1103, the data portion separation module separates the DOM object into data portions of a fixed length. The data portions may have a fixed length of any suitable length depending on the length of the rendered DOM object. Typically, the data portions of the DOM object may have a fixed length somewhere in the range of 10 characters and may have tens of thousands data portions.

At step 1104, the hash signature generation module applies a hashing function to each of the data portions to generate hash values for each of the data portions. For example, in some embodiments, applying the hash function includes applying a predetermined number of hashing functions to the plurality of data portions such that a number of different hashing values are generated for each of the plurality of data portions. The predetermined number of hashing functions may be generated using a common seed value and using at least one randomly generated input variable to generate sufficiently different hashing algorithms between the predetermined number of hashing functions. Thus, by applying the plurality of different predetermined number of hashing functions, a predetermined number of values for each of the plurality of data portions is generated. For example, for a DOM object that has 10,000 data portions, 10,000 different hash values may be generated for each of the plurality of hash functions.

At step 1105, the hash signature generation module creates a hash signature by selecting a predetermined number of hash data portions using a selection policy. A selection policy may be repeatable and consistent rule that can be applied across multiple different numbers of data portions for a document and types of data. For example, the selection policy may include a minimum value, a maximum value, and/or a median value for the set of hashed data portions.

For example, for a MinHash algorithm, the selection policy may include taking the minimum hash value for each hashing function. Thus, where the predetermined number of hashing functions includes 100 different hashing functions being generated, the selection policy may select a minimum hash value from the 10,000 hash values generated by applying one of the hash functions. The result would be one of 100 different minimum hash values selected by the selection policy and the selection process may be repeated for each of the 100 hash functions applied to the 10,000 data portions. Thus, a hash signature may be generated including 100 of the minimum hash values of the 10,000 data portions for each of the 100 different hash functions applied to the 10,000 data portions. Accordingly, the hash signature may include 100 hashing samples of a much larger document (e.g., 10,000 data portions) that may be repeatedly found in other documents that apply the same hashing algorithms and selection process across documents.

At step 1106, the website classification module compares the hash signature of the DOM object to a known hash signature of a DOM object generated from another website that is associated with a first classification. The comparison may include comparing each of the plurality of hashed data portions within the hash signature to a plurality of known hashed data portions of the known hash signature. For each hash signature that matches, the system may determine that data portions within the target website and the classified website are the same. This process may be repeated until all of the hashed data portions within the hash signature are compared to the hash signature of the known DOM object hash signature.

At step 1107, the website classification module calculates a similarity measurement between the hash signature of the DOM object and the known hash signature of the DOM object generated from the other website. The similarity measurement may include a fraction of the total number of matching hash values divided by the total number of hash values within the hash signature. For example, using the example described above, for a hash signature that has 100 hash values with 32 matching selected hashes, the similarity measurement may be 32/100 or 32%. Where there are more or less hash values, the total number of matching hashes may be divided by the total number of hashes in the hash signature to determine a percentage of similarity for the sampled minimum hash values between the two hash signatures.

At step 1108, the website classification module classifies the website and, in some embodiments, the web server based on the similarity measurement by comparing the similarity measurement to a similarity threshold for the classification. The similarity threshold for a particular classification may be determined based on the type of classification and may be different for different types of classifications. Thus, the system may determine a similarity threshold for the classification, compare the similarity to the similarity threshold, and may determine whether the website has a classification based on whether the similarity measurement exceeds the similarity threshold. Accordingly, the system may determine the similarity between websites, determine whether the target website has a similarity measurement close enough to meet a similarity threshold corresponding to the classification and may classify the hash signature and the website as having a particular classification based on the similarity threshold.

C. Searching a Corpus of Hash Signatures in Order to Classify a Website Using a Weighted Similarity Measurement of the Most Similar Hash Signatures Additionally, in some embodiments, a generated hash signature may be compared to a hash signature database including previously generated and classified hash signatures to determine the similarity of a website to the previously classified websites using a variety of the closest weighted results in the corpus to determine a classification of a hash signature.

Thus, some embodiments may be configured to search one or more classifications for the closest N number of closest hash signatures stored in the classified hash signature database. In such embodiments, the system can weigh the similarity of the most similar hash signatures to determine the distance weighted k-nearest neighbors to ensure there is not over-fitting based on a particular result or outlier hash signature. The system can query a database of hash signatures within a classification and can classify a target website according to the closest hash signatures within the classification.

Accordingly, in some embodiments, a similarity may be determined that includes a weighted similarity of the most similar hash signatures stored within the classified hash signature database. The closest matching hash signatures may be classified as confirmed or dismissed for any particular classification. Thus, the system may calculate a similarity measurement based on the weighted similarity weights based on hash signatures that are the closest matching confirmed hash signatures for a classification. Accordingly, in some embodiments, the weighted similarity measurement may not provide a true similarity between the number of matching vs. total number of hashes. Instead, it may provide a weighted similarity measurement based on the closest confirmed hash signatures for a particular classification.

For example, if a search within a classification returns ten similar hash signatures, the weighted similarity may include the distance related between the top ten results so that there is a linear weight between the ten results. This allows the system to provide more value to the highest weighted results while correcting for false positives. Thus, the eleventh most similar result would be provided a zero weight and then all the other results may be provided a linear weight up to the most similar which then has a weight of the estimated Jaccard similarity. The other results are provided a degrading linear weight based on the distance of the other results from the most similar result.

A sum of the similarity weights for those ten pages provides a total weighting for the returned number of similar pages. For instance, if there is only one page that is very similar, that hash signature may be weighted very high but that high weighting may be diminished by the other nine hash signatures that are very dissimilar and those will be weighted very low. So when the weightings are summed together, and divided by the total weighting of all of the returned similarity of the hash signatures, the single confirmed match may be determined to be a false positive or an outlier.

Accordingly, if there is one really similar result but that result is very different from the other returned results, the computing device may not end up being classified with the classification of the single result depending on the distribution and weighting of the other hash signatures. So if the top result is a confirmed page but the other results are dismissed pages, these dismissed pages may weight much lower than the confirmed page. Only the confirmed weights are summed but that amount is divided by the weights of all the closest returned results. Thus, if there is a noisy sample where several dismissed matching hash signatures are very close to the weighting of the single confirmed hash signature, the similarity score of the returned results may in fact become low even though a high similarity may be returned for one result.

As such, the dismissed results are included in the returned samples so that the system can separate dismissed results from the confirmed results and provide a counter-weight to false-positives. Thus, by only summing confirmed results, the system can distinguish between confirmed and dismissed results and determine whether it is more likely that the result is confirmed or dismissed. Accordingly, some embodiments may include a number of closest matching results (which may include dismissed results) to get a larger sampling size of the results returned by the search of the closest matching hash signatures to ensure an accurate result. Accordingly, dismissed hash signatures may be included in the classification search of a corpus to distinguish between confirmed matches and dismissed matches. Thus, the corpus should be selected to have a non-biased sample. Thus, a corpus of classified hash signatures may have a mix of confirmed and dismissed hash signatures.

Additionally, by multiplying by the maximum weighting result, the system can identify and factor in that none of the results provide a good match and thus, the system should dismiss the webpage as not being part of the classification. For example, if the closest match is only 10% similar, the highest score you can have is a 10% similarity measurement. Thus, the website will be classified as dismissed even if all of the results are confirmed where they are all only 10% similar (assuming the similarity threshold is higher than 10%).

Figure 12:
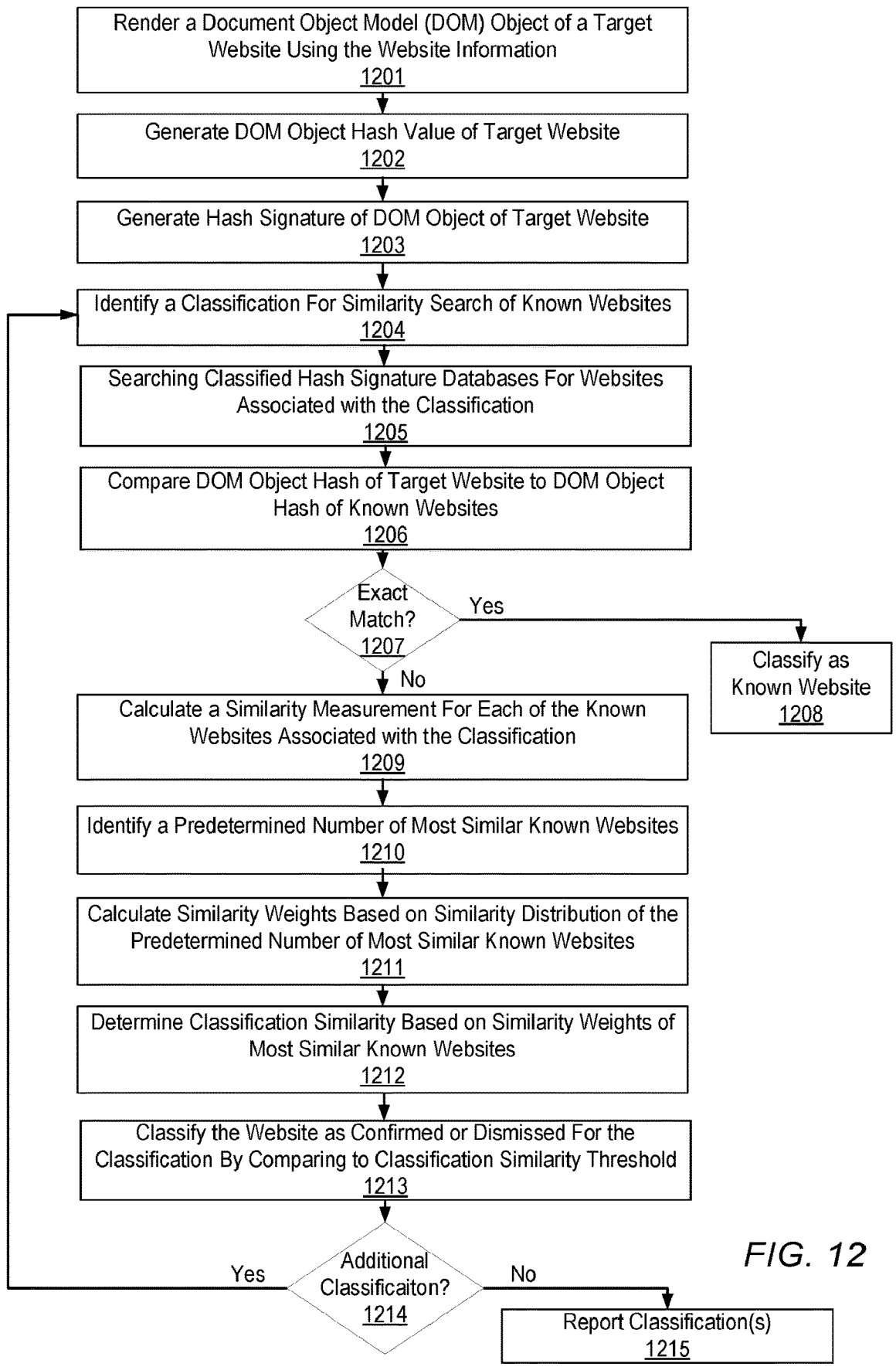
FIG. 12 shows an exemplary method of classifying a website based on a database of classified known hash signatures based on a similarity measurement, according to one embodiment of the present invention.

FIG. 12 shows an exemplary method of determining the most similar websites to a target website based on the hash signatures of a rendered DOM object of the present/target website and between the stored DOM object hash signatures of the known websites within one or more particular classifications. Before the process shown in FIG. 12 may be performed the classified hash signature database may be built with confirmed and dismissed web pages in one or more different classifications. The various hash signatures may be classified such that an elastic search can be performed in a classification to find the confirmed and dismissed hash signatures with the classification.

At step 1201, a DOM rendering module may render a DOM object of a target website using the website information associated with the website. This process is similar to those described above in reference to FIGS. 3 and 11.

At step 1202, a hash signature generation module may generate a DOM object hash value of the target website based on the rendered DOM object. The DOM object hash value may include a static value that is generated by applying a known hash algorithm to the rendered DOM object of the target website. The same hashing algorithm may have been applied to the rendered DOM objects of the known websites stored in the classification database. Thus, static values for the DOM object of the target website may be compared directly with the static hash of the previously classified websites stored in the classified hash signature database.

For example, the system may have a classified hash signature database containing thousands of hash signatures generated from the DOM objects of previously discovered and analyzed websites. Along with each hash signature, the classified hash signature database may include a static hash (MD5) of the DOM object and labels assigned to each hash signature (e.g. confirmed phishing, confirmed fake pharma, dismissed phishing, etc.). When a candidate page enters the system, a static hash (e.g., MD5 hash) may be generated and may be compared to other websites within the database. If that static hash (e.g., MD5 hash) exists, the system determines that an exact match has been identified and may assign the same classification to the target webpage as the website associated with the matching static hash.

At step 1203, a hash signature generation module may generate a hash signature of the rendered DOM object of the target website. The hash signature may be generated using the processes described above in reference to FIGS. 6-11.

At step 1204, a website classification module may identify a classification for a similarity search of known websites. The classification may be determined through any suitable method. For example, the classification may entered by an operator, automatically based on a manner in which the target website was identified and/or referred to the computing device, and/or through any other suitable method. For example, a target website may be referred to the computing device for analysis through a client sending a notification of a potential phishing website address. In such a case, the classification may be selected as phishing and the system may search the phishing classification for classified hash signatures within the stored classification.

At step 1205, the website classification module may search the classified hash signature database for websites and corresponding hash signatures associated with the classification. For example, if the identified classification is a phishing classification, the computing database may search through the classified phishing classification for hash signatures associated with confirmed and dismissed hash signatures being stored as being within the phishing classification.

At step 1206, the website classification module may compare the hashing signature of the target website with the stored hash signatures returned from the search through the classified database associated with the database. The computing device may compare each hash value within the target hashing signature to the corresponding hash value within the classified hash signatures stored for that classification. For example, the system may determine the number of classified hash signatures that have a −13 as the minimum hash value for the first hash function. The system may store the result of the classified website results with a matching result for the first hash function and may continue through each of the hash values in the target website hash signature.

At step 1207, the website classification module may determine whether any of the classified hash signatures have an exact match with the target website hash signature. Further, before determining a similarity measurement between the hash signature, a comparison of the static hash between the target website and the classified websites may be determined. In some embodiments, this analysis may be done before the rest of the hash signature is compared to determine whether any exact copies of the target website are already included in the corpus to avoid unnecessary processing.

At step 1208, if an exact match between the static hash of the target website and the classified websites exist, the website classification module may classify the target website as having the same classifications as the classified website and the process may either continue or may be stopped. Further, in some embodiments, where the static hash between any of the classified websites and the target website are not found but the sampled hash signature results in an exact match, the same classification may be completed as the websites may be so similar that the sampled results were the same. Thus, the classification is likely accurate as the websites are likely very similar. However, the likelihood of similarity may be dependent on the parameters fed into the hashing calculation including the number of data portions, length of the shingles used, number of hashing functions applied to the data portions, etc.

At step 1209, if an exact match is not present, the website classification module may calculate a similarity measurement for each of the known websites associated with the classification. The similarity measurement may include comparing the target hash signature placement for each of the hash values within the hash signature and comparing to the same location within the known hash values of the returned known hash signatures. Accordingly, the returned hash signatures may be searched for one or more of the most similar hash signatures based on the similarity measurement for each of the returned known hash signatures.

At step 1210, the website classification module may identify a predetermined number of the most similar known websites stored within the classified hash signature database. The predetermined number of the most similar known websites may include any suitable number. For example, 5, 10, 100, and/or any other suitable number of closest matching hash signatures may be selected. In some embodiments, the number of returned closest matches may depend on the number of the stored and classified hash signatures for the classification. For instance, where thousands or hundreds of thousands of hash signatures are stored, it may be beneficial to include a higher number of results, and vice versa.

Accordingly, the computing device may query the data store for the N closest hash signatures which may be calculated, selected, and returned. When returned by the database, the similar pages also include a similarity score. The similarity score may be determined by the number of hashes in the target hash signature that match the stored hash signature for each of the known hash signatures. Thus, the N number of hash signatures that include the most matching hash values as the target hash signature may be returned.

At step 1211, the website classification module may calculate similarity weights of the predetermined number of most similar hash signatures based on the similarity distribution of the predetermined number of most similar known website hash signatures. For example, the similarity weights for each of the N closest returned hash signatures may be calculated according to a linear regression from the highest matched most similar hash signature.

At step 1212, the website classification module may determine the classification similarity based on the similarity weights of the most similar known website hash signatures. Further, the similarity measurement may be determined only by the weighting of the hash signatures that are confirmed for the classification. Accordingly, the numerator for determining the similarity may be the sum of the similarity weighting for the websites that are confirmed as being a part of the classification and may not include the similarity weighting of dismissed hash signatures for the classification. Accordingly, the similarity of the target hash signature to the N most similarly returned hash signatures may include the weighting of the confirmed hash signatures divided by the sum of all of the weights of the most similar hash signatures multiplied by the most similar hash signature similarity value. Thus, some embodiments may implement methods to ensure that false positives and/or outlier results to do not overly outweigh the majority of the returned similarity results.

Figure 13:
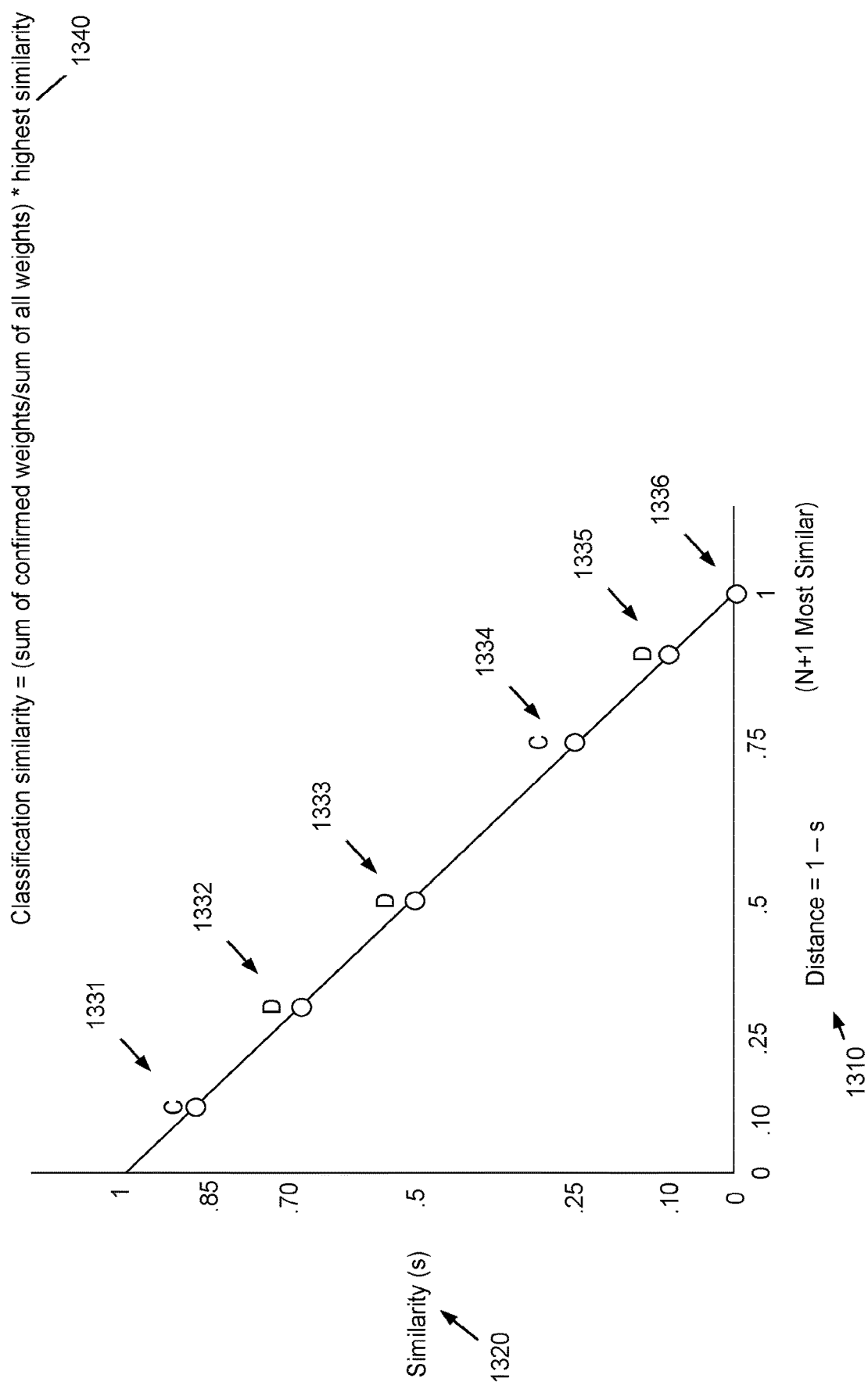
FIG. 13 shows an exemplary result of a weighting calculation for determining the similarity measurement and for performing a classification of a website, according to one embodiment of the present invention.

For instance, FIG. 13 shows an exemplary similarity graph that has a digressing linear weighting based on the distance of the five closest returned most similar hash signatures. The x-axis of the similarity distribution shown in FIG. 13 includes a distance calculation for the 5 most similar hash signatures. The y-axis is the weighted similarity for the 5 most similar hash signatures. The hash signatures 1331-1336 show the 5 most similar hash signatures and a linear digression of the weighted similarity based on the similarity of each of the 5 most similar hash signatures. As shown in FIG. 13, the most similar 1331 and the second least similar results 1334 are confirmed results (indicated by the c designation) and the hash signatures 1332-1333, 1335 are dismissed for the classification. Thus, the weighted similarity of the 5 most similar results includes the sum of the weighted similarity of the confirmed hash signatures (e.g., 0.85+0.25) divided by the total weighting of all of the most similar results (e.g., 0.85+0.7+0.5+0.25+0.1) multiplied by the maximum similarity (0.85). In this example, the final similarity may be equal to 1.1/2.4*0.85=0.39.

At step 1213, the website classification module may classify the target website as confirmed or dismissed for the classification by comparing the classification similarity threshold to the similarity weight for the returned most similar known website hash signatures. Accordingly, the weighted similarity measurement may be calculated and the weighted similarity may be compared to a threshold similarity value to determine whether the hash signature is confirmed or dismissed for the classification. In the example shown in FIG. 13, the website may be confirmed or dismissed for the classification based on whether the similarity threshold is above or below 0.39. For example, if the similarity threshold is 0.4, the website would be dismissed. However, if the similarity threshold is 0.35, the website would be confirmed as being part of the classification. The classification similarity algorithm 1340 is shown in FIG. 13.

At step 1214, if another classification is included in a similarity search, the process of steps 1204-1213 described above may be repeated until there are no more classification searches to be completed. Thus, the DOM signature hash signature can be reused to classify the status of other page types (e.g. defacement, offensive material, fake pharmaceuticals, etc.). Additionally, in some embodiments, when the page type is not specified for the classification, the hash signature may be searched for multiple classifications to determine if the website matches with different classifications other than the first classification in order classify the type of page. Thus, the entire classification can be searched in some embodiments, to determine the closest classification or multiple classifications in which the website can be confirmed as matching.

At step 1215, if there are no more classification searches to be completed, a reporting module may report the one or more classifications associated with the target website. Additional details are provided below for the reporting functionality.

Note that in some embodiments, the embodiments and techniques described in related U.S. Non-provisional application Ser. No. 14/938,802, titled "IDENTIFYING PHISHING WEBSITES USING DOM CHARACTERISTICS," filed on Nov. 11, 2015, and which is a non-provisional application of and claims the benefit of priority to U.S. Provisional Application No. 62/219,623, filed Sep. 16, 2015, both of which are hereby incorporated by reference in their entirety for all purposes, may be applied to embodiments described herein in order to identify website similarity. For example, a phishing model may be generated and used with the hash signatures of the present invention to identify similarity between two websites and to identify websites performing phishing and/or other similar characteristics between websites.

III. Action Based on Data Analysis—Mediation

Once the similarity and classification analysis has been completed and a website has been classified as similar to a designated classification, a reporting module may be configured to take any relevant steps to mediate a website that has been identified as being classified with an undesirable activity.

The computing device may perform any number of different activities to mediate a website identified as being associated with a type of classification. For example, the computing device may report the classification to an entity hosting the web server that is hosting the website. The reporting may be completed through any suitable method including email, text message, phone call, and/or any other suitable method for notifying a host and/or control system of the existence of a matching classification. The reporting message may include the website information, the type of classification, the similarity measurement, and/or any other suitable information that may be helpful in mediating the website.

Additionally, the computing device may store the results of the similarity analysis and periodically analyze the identified website to determine whether the website being associated with the classification has been "resolved" or taken down. Such a determination may be made where a previously classified website that is performing some activity associated with a classification is identified as no longer performing that activity such that the website is no longer being confirmed with that classification (i.e., the web host removed the phishing functionality from the web site) and/or the website has been taken down (i.e., the web host killed the website such that it no longer is accessible). Thus, embodiments allow the computer system to make sure that a classified website is no longer associated with the classification activity and/or that the website has been taken down. For example, a web host may only take down part of a website—not an entire site. Thus, the system continues to analyze the website periodically until the website is no longer offending and/or being associated with the classification activity.

As such, embodiments may classify a website associated with the remote server computer as performing or being associated with one or more classifications and may report the classified website for one or more mediation activities including take-down, monitoring, and/or a re-classification/success reporting action. The system may further determine an operating status of the website associated with remote server computer and report the operating status of the website to a monitoring system to determine whether additional monitoring is necessary or if the website has been taken down or the classified functionality has been removed.

IV. Exemplary Computer System

Figure 14:
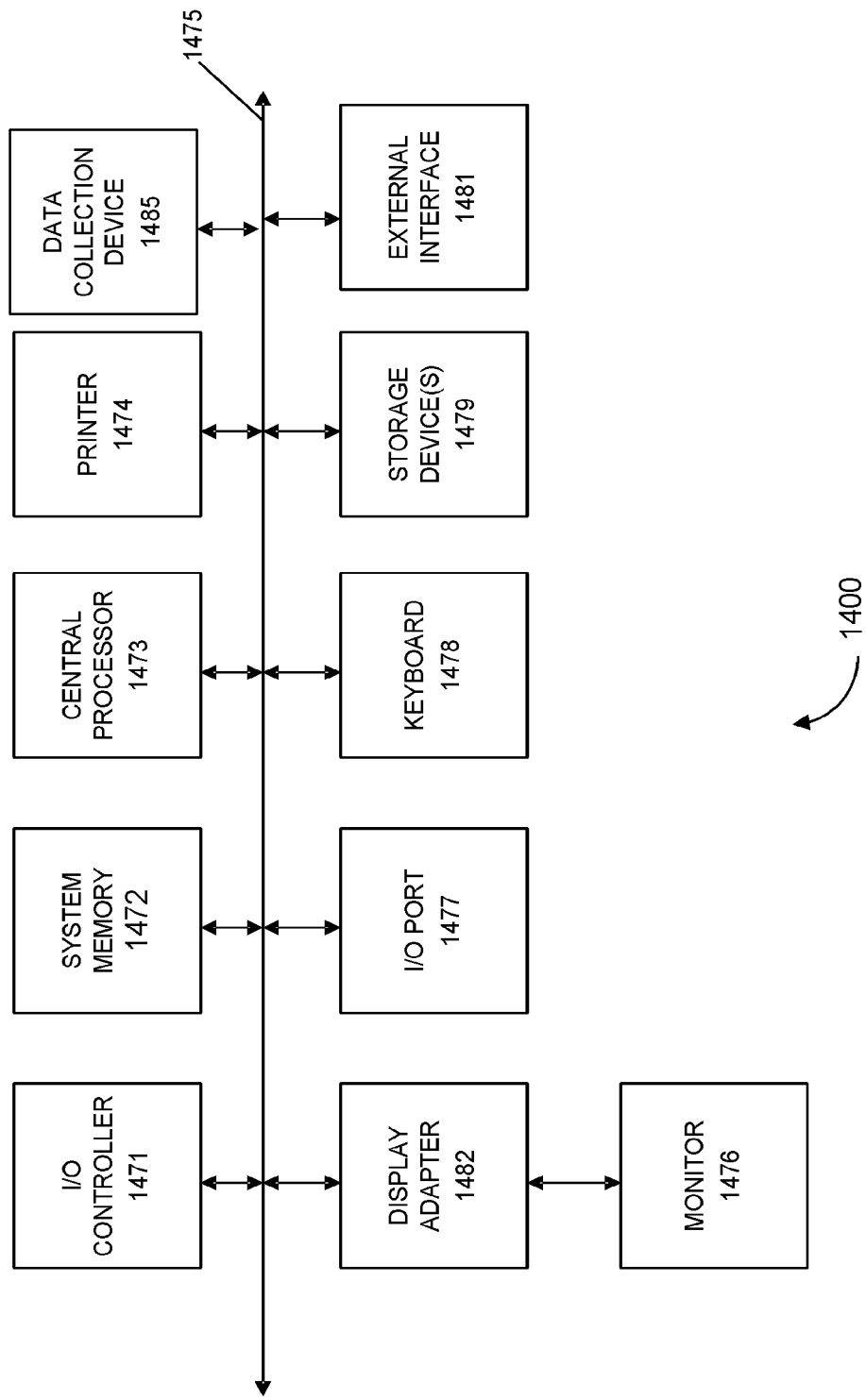
FIG. 14 shows an exemplary computer system.

FIG. 14 shows a block diagram of an example computer system 1400 usable with system and methods according to embodiments of the present invention.

Any of the computer systems mentioned herein may utilize any suitable number of subsystems. Examples of such subsystems are shown in FIG. 14 in computer apparatus 1400. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 14 are interconnected via a system bus 1475. Additional subsystems such as a printer 1474, keyboard 1478, fixed disk 1479, monitor 1479, which is coupled to display adapter 1482, and others are shown. Peripherals and input/output (I/O) devices, which couple to I/O controller 1471, can be connected to the computer system by any number of means known in the art, such as serial port 1477. For example, serial port 1477 or external interface 1481 (e.g. Ethernet, Wi-Fi, etc.) can be used to connect computer system 1400 to a wide area network such as the Internet, a mouse input device, or a scanner. The interconnection via system bus 1475 allows the central processor 1473 to communicate with each subsystem and to control the execution of instructions from system memory 1472 or the fixed disk 1479, as well as the exchange of information between subsystems. The system memory 1472 and/or the fixed disk 1479 may embody a computer readable medium. Any of the values mentioned herein can be output from one component to another component and can be output to the user.

A computer system can include a plurality of the same components or subsystems, e.g., connected together by external interface 1481 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method, comprising:
   storing signatures of one or more portions of an original website;
   retrieving a suspect website;
   comparing one or more portions of the suspect website to one or more portions of the original website by:

calculating a similarity measurement between each portion of the one or more portions of the suspect website and the one or more portions of the original website;

comparing the similarity measurement to a threshold, the threshold dependent upon a type of activity being analyzed;

based on the comparing the similarity measurement to the threshold, determining that the suspect website is similar to the original website; and based on the determination that the suspect website is similar to the original website, classifying the website with a classification associated with the threshold.

2. The method as recited in claim 1, wherein the original website is associated with one or more classifications.

3. The method as recited in claim 1, wherein the original website is associated with one or more classifications, wherein each classification is associated with a different similarity threshold.

4. The method as recited in claim 1, further comprising:
storing results of the similarity measurement; and
periodically analyzing the suspect website to determine whether the suspect website is no longer associated with the classification.

5. The method as recited in claim 1, further comprising:
storing results of the similarity measurement; and
periodically analyzing the suspect website to determine whether the suspect website has been taken down.

6. The method as recited in claim 1, further comprising:
reporting the classification to an entity hosting a web server that is hosting the suspect website.

7. The method as recited in claim 1, further comprising:
based on the comparing the similarity measurement to the threshold, determining that the suspect website is not similar to the original website; and
based on the determination that the suspect website is not similar to the original website, calculating a similarity measurement between each portion of the one or more portions of the suspect website and one or more portions of one or more other known websites.

8. One or more non-transitory computer-readable storage media, storing one or more sequences of instructions, which when executed by one or more processors cause performance of:
storing signatures of one or more portions of an original website;
retrieving a suspect website;
comparing one or more portions of the suspect website to one or more portions of the original website by:
calculating a similarity measurement between each portion of the one or more portions of the suspect website and the one or more portions of the original website;
comparing the similarity measurement to a threshold, the threshold dependent upon a type of activity being analyzed;
based on the comparing the similarity measurement to the threshold, determining that the suspect website is similar to the original website; and
based on the determination that the suspect website is similar to the original website, classifying the website with a classification associated with the threshold.

9. The one or more non-transitory computer-readable storage media as recited in claims 8, wherein the original website is associated with one or more classifications.

10. The one or more non-transitory computer-readable storage media as recited in claim 8, wherein the original website is associated with one or more classifications, wherein each classification is associated with a different similarity threshold.

11. The one or more non-transitory computer-readable storage media as recited in claim 8, further comprising:
storing results of the similarity measurement; and
periodically analyzing the suspect website to determine whether the suspect website is no longer associated with the classification.

12. The one or more non-transitory computer-readable storage media as recited in claim 8, further comprising:
storing results of the similarity measurement; and
periodically analyzing the suspect website to determine whether the suspect website has been taken down.

13. The one or more non-transitory computer-readable storage media as recited in claim 8, further comprising:
reporting the classification to an entity hosting a web server that is hosting the suspect website.

14. The one or more non-transitory computer-readable storage media as recited in claim 8, further comprising:
based on the comparing the similarity measurement to the threshold, determining that the suspect website is not similar to the original website; and
based on the determination that the suspect website is not similar to the original website, calculating a similarity measurement between each portion of the one or more portions of the suspect website and one or more portions of one or more other known websites.

15. An apparatus, comprising:
one or more processors; and
a memory storing instructions, which when executed by the one or more processors, causes the one or more processors to:
store signatures of one or more portions of an original website;
retrieve a suspect website;
compare one or more portions of the suspect website to one or more portions of the original website by:
calculating a similarity measurement between each portion of the one or more portions of the suspect website and the one or more portions of the original website;
comparing the similarity measurement to a threshold, the threshold dependent upon a type of activity being analyzed;
based on the comparing the similarity measurement to the threshold, determining that the suspect website is similar to the original website; and
based on the determination that the suspect website is similar to the original website, classifying the website with a classification associated with the threshold.

16. The apparatus as recited in claim 15, wherein the original website is associated with one or more classifications.

17. The apparatus as recited in claim 15, wherein the original website is associated with one or more classifications, wherein each classification is associated with a different similarity threshold.

18. The apparatus as recited in claim 15, wherein the instructions, which when executed by the one or more processors, further causes the one or more processors to:
store results of the similarity measurement; and periodically analyze the suspect website to determine whether the suspect website is no longer associated with the classification.

19. The apparatus as recited in claim 15, wherein the instructions, which when executed by the one or more processors, further causes the one or more processors to:
store results of the similarity measurement; and
periodically analyze the suspect website to determine whether the suspect website has been taken down.

20. The apparatus as recited in claim 15, wherein the instructions, which when executed by the one or more processors, further causes the one or more processors to:
report the classification to an entity hosting a web server that is hosting the suspect website.

\* \* \* \* \*